United States Patent
Schreck et al.

(10) Patent No.: US 12,166,555 B2
(45) Date of Patent: Dec. 10, 2024

(54) TECHNIQUES TO IMPROVE COMPUTATIONAL EFFICIENCY IN MASSIVE MULTIPLE INPUT MULTIPLE OUTPUT (MIMO) SYSTEMS

(71) Applicant: Intel Corporation, Santa Clara, CA (US)

(72) Inventors: Jan Schreck, San Jose, CA (US); Nicholas Whinnett, Swainswick (GB); Thushara Hewavithana, Tempe, AZ (US); Yang-Seok Choi, Portland, OR (US); Shilpa Talwar, Cupertino, CA (US)

(73) Assignee: Intel Corporation, Santa Clara, CA (US)

(*) Notice: Subject to any disclaimer, the term of this patent is extended or adjusted under 35 U.S.C. 154(b) by 657 days.

(21) Appl. No.: 17/357,769

(22) Filed: Jun. 24, 2021

(65) Prior Publication Data

US 2022/0416868 A1    Dec. 29, 2022

(51) Int. Cl.
*H04W 52/50* (2009.01)
*H04B 7/0456* (2017.01)
*H04B 7/06* (2006.01)
*H04L 5/00* (2006.01)

(52) U.S. Cl.
CPC ......... *H04B 7/0634* (2013.01); *H04B 7/0456* (2013.01); *H04B 7/0617* (2013.01); *H04L 5/0048* (2013.01)

(58) Field of Classification Search
CPC .... H04B 7/0421; H04B 7/0854; H04B 7/043; H04B 7/0669; H04B 7/0697; H04B 7/0417; H04B 7/0452; H04B 7/0871; H04W 52/50; H04W 16/28; H04W 28/20; H04W 52/42; H04W 72/046; H04W 74/04; H04W 72/12; H04W 28/22; H04W 84/12; H04L 25/03343; H04L 25/0248; H04L 2025/03426; H04L 25/0204; H04L 1/06; H04L 1/0017; H04L 27/2647; H04L 25/0226
USPC ....................................................... 375/267
See application file for complete search history.

(56) References Cited

U.S. PATENT DOCUMENTS

| | | | |
|---|---|---|---|
| 10,348,380 B1* | 7/2019 | Qi ........................ | H04B 7/0417 |
| 11,210,440 B1* | 12/2021 | Chowdhury ........ | G06F 16/9024 |
| 2008/0027689 A1* | 1/2008 | Jandhyala ............... | G06F 30/20 |
| | | | 703/2 |

(Continued)

OTHER PUBLICATIONS

Wübben, "Efficient algorithm for decoding layered space-time codes," Article in Electronics Letters · Nov. 2001, DOI: 10.1049/el:20010899—Source: IEEE Xplore; 3 pages.

*Primary Examiner* — Eva Y Puente
(74) *Attorney, Agent, or Firm* — Schwabe, Williamson & Wyatt, P.C.

(57) ABSTRACT

Various embodiments herein provide techniques for reducing computational complexity in multiple input multiple output (MIMO, e.g., massive MIMO (mMIMO)) communications, such as efficient decomposition of a channel covariance matrix. Embodiments enable accurate mMIMO channel estimation with relatively low computational complexity compared with prior techniques. Additionally, embodiments may provide efficient beamforming and/or spatial compression. Other embodiments may be described and claimed.

25 Claims, 11 Drawing Sheets

(56) References Cited

U.S. PATENT DOCUMENTS

| | | | |
|---|---|---|---|
| 2010/0255790 A1* | 10/2010 | Farajidana | H04B 17/26 455/69 |
| 2012/0033566 A1* | 2/2012 | Porat | H04L 25/03343 370/252 |
| 2019/0312753 A1* | 10/2019 | Zhang | H04B 7/0626 |

* cited by examiner

TECHNIQUES TO IMPROVE COMPUTATIONAL EFFICIENCY IN MASSIVE MULTIPLE INPUT MULTIPLE OUTPUT (MIMO) SYSTEMS

FIELD

Various embodiments generally may relate to the field of wireless communications.

BACKGROUND

Massive multiple input multiple output (mMIMO) is considered as one of the promising technologies for wireless cellular networks. The use of large number of the antennas with digital transceiver units (TXRUs) at the base station (BS) improves the capacity of the network through use of the advanced beamforming techniques effectively mitigating both inter- and intra-cell interferences.

In some mMIMO deployments, a set of remote radio units (RUs or RRUs) with large number of antennas are connected to a centralized baseband unit (BBU) through a high bandwidth and low-latency fronthaul (FH) link. The BBU may be further split into a distributed unit (DU) and a centralized unit (CU).

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
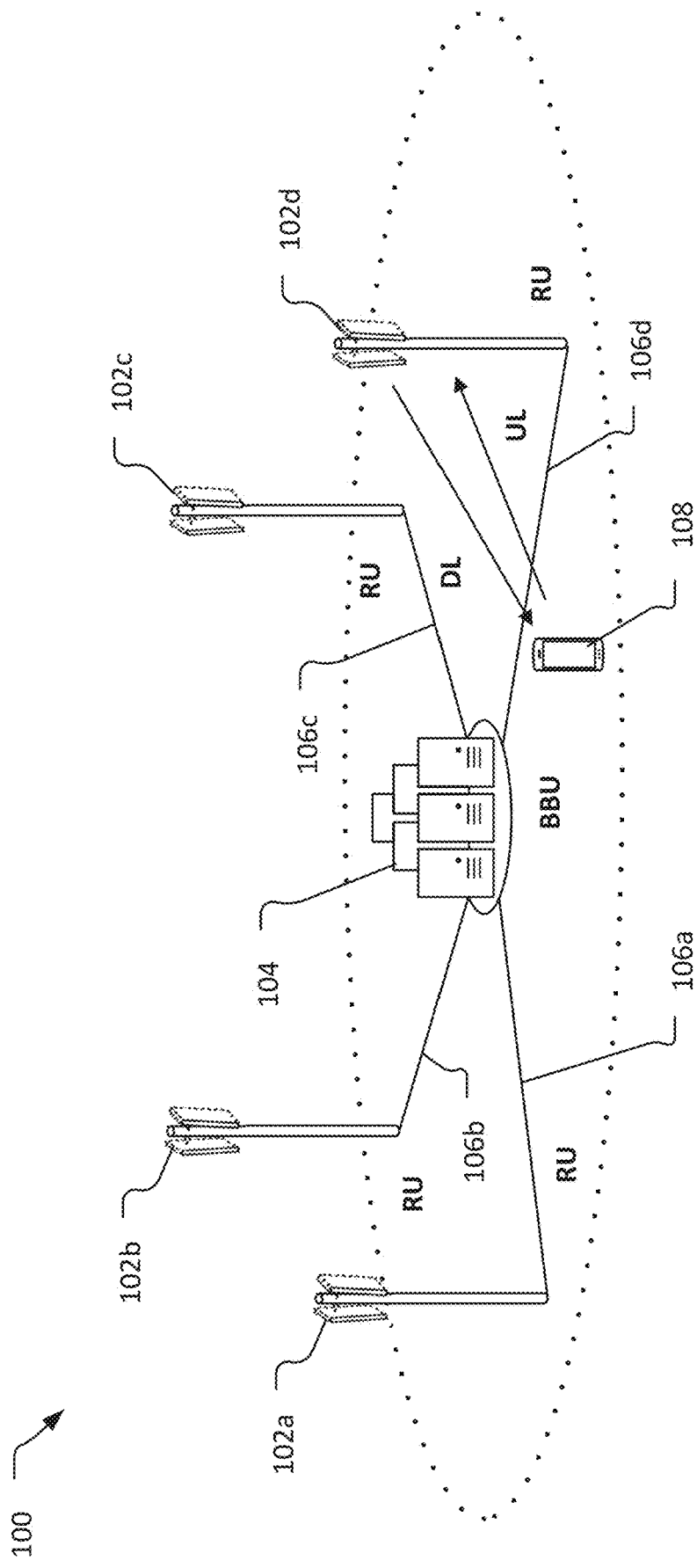
FIG. 1 illustrates a network environment in accordance with various embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrases "A or B" and "A/B" mean (A), (B), or (A and B).

Various embodiments herein provide techniques for reducing computational complexity in multiple input multiple output (MIMO, e.g., massive MIMO (mMIMO)) communications, such as efficient decomposition of a channel covariance matrix. Embodiments enable accurate mMIMO channel estimation with relatively low computational complexity compared with prior techniques. Additionally, embodiments may provide efficient beamforming and/or spatial compression.

Transmit and receive beamforming are important to exploit the benefits of multi-antenna wireless systems. Under certain assumptions, beamforming based on the Eigenvectors of the channel covariance matrix is optimal. Spatial compression is a related technique that becomes increasingly important as the number of antennas grows. In a mMIMO system spatial compression is used between a remote radio unit and the remainder of the baseband processing to compress the spatial dimensions from the number of receiver antennas to a much smaller number of virtual antennas. Optimal spatial compression can be shown to be given by the range (also called the image or column space) of the channel covariance matrix. The channel covariance matrix of user k may be defined as the outer product:

$$C_k = \Sigma_{s \in S} h_k(s) h_k(s)^H, \qquad (1)$$

with $h_k(s) \in \mathbb{C}^{n \times l}$ the channel vector from user k to the receiver (in the case of l=1 spatial "layer" per user, or a channel matrix in the case of l>1 layers per user), the spectral resources and n the number of antennas. The channel is sampled on spectral resources $S = \{s_1, \ldots, s_{n_s}\}$, e.g., subcarriers in an orthogonal frequency division multiplexing (OFDM) based system. To estimate $C_k$ the channel vectors $h_k(s)$ need to be estimated first. In a mMIMO system n may be very large, such that estimating $h_k(s)$ in near real-time requires dedicated hardware acceleration.

Various embodiments herein may enable accurate mMIMO channel estimation (e.g., estimation of $h_k(s)$) with relatively low computational complexity compared with prior techniques. Additionally, embodiments may provide efficient spatial compression. For example, given channel estimates $h_k(s)$, embodiments herein may be used to estimate the range of the empirical channel covariance matrix $C_k$ with relatively low computational complexity. Furthermore, embodiments herein may provide efficient uplink or downlink beamforming weight calculation from a covariance matrix (e.g., mapping of multiple streams/layers to or from a larger number of antennas).

Previous solutions can be divided in two main groups. The first group is a class of codebook-based schemes (also called grid-of-beams) that aim at estimating the range of C or determine beamforming vectors based on a predefined quantization codebook. The second group is a class of matrix decomposition-based schemes (also called non-grid-of-beams). In that case one would spend significant effort to accurately estimate C and then compute a suitable matrix decomposition, like a full-blown Eigendecomposition or a QR decomposition.

Codebook-based approaches, while conceptually simple, have a high software complexity due to the need to calculate matrix products for large numbers of candidate beams. Furthermore, due to the predefined quantization grid, the accuracy is usually not good for reasonable number of output beams. This results in loss of spectral efficiency and/or related metrics. A large number of output beams (e.g., a few times the rank of covariance matrix) may mitigate the losses but have a big impact on beam compression gain.

Matrix decomposition-based schemes (e.g. singular value decomposition (SVD)-based beamforming) generally achieve better performance. They generally do this with the number of beams equal to the rank of covariance matrix, or equal to N×L, with L being the total number of layers over all users, and N being a fixed value such as 1 or 2. However, they typically impose significant computational complexity.

Various embodiments herein enable computational efficient and almost lossless compression of a large number of antenna streams. Complexity may be significantly reduced by selecting a subset of columns of the covariance matrix of the signal to be compressed. This compression approach may be used for complexity reduction prior to channel estimation, and/or for estimating weights to apply for spatial compression and/or beamforming.

The disclosed techniques may provide near optimal wireless performance, with significantly lower implementation cost (for example, cycle counts for software implementations) compared with competing approaches such as a full dimension QR decomposition, SVD, or searching from a set of predefined beams.

Aspects of various embodiments are described further below.

Example Network Environment

FIG. 1 illustrates a network environment 100 for a radio access network (RAN), in accordance with various embodiments. In some embodiments, the RAN may be an open-RAN (O-RAN) and/or cloud-RAN (C-RAN) architecture. The network environment 100 may include a plurality of radio units (RUs, also referred to as remote radio units (RRUs)) 102a-d communicatively coupled to a baseband unit (BBU) 104 via a fronthaul (FH) link 106a-d. The RUs 102a-d may communicate with one or more user equipments (UEs), such as UE 108, via a set of antennas with digital transceiver units (TXRUs). The network environment 100 may be used for massive multiple input, multiple output (MIMO) communication.

In embodiments, the BBU 104 may be further split into a distributed unit (DU) and a centralized unit (CU). In various embodiments, one or more processing operations may be performed partially or completely at the respective RU 102a-d and/or BBU 104 (e.g., DU and/or CU).

In an O-RAN architecture, the RUs 102a-d may be referred to as open RUs (O-RUs), the DU may be referred to as an open DU (O-DU), and the CU may be referred to as an open CU (O-CU).

Efficient Decomposition of mMIMO Channel Covariance Matrices

In the mMIMO regime, the channel covariance matrix $C_k$ (e.g., as defined above in Equation (1)) typically has low rank or can be well approximated by a low rank matrix. As described further below (see Embodiment 1-3), estimating the range of the mMIMO channel covariance matrix is instrumental in reducing the complexity of various baseband algorithms.

Let $Q \in \mathbb{C}^{n \times l}$ be an orthonormal matrix. It may be said that Q approximates the range of $C \in \mathbb{C}^{n \times n}$, if the following holds, $$\frac{\|(I_n - QQ^H)C\|_2}{\|C\|_2} \le \varepsilon, \quad (2)$$

with $\varepsilon > 0$ a specified tolerance. A simple baseline solution to estimate the range of a rank l matrix it to perform the QR decomposition $C = Q_0 R$. The range will then be given by the first l columns of $Q_0$. However, this solution requires to first compute C and then perform a full QR decomposition.

In accordance with various embodiments, C may be approximated by a low-rank matrix to provide increased efficiency while still providing an accurate solution. For example, if C can be approximated by a low-rank matrix, then a small number of columns carries sufficient information to estimate its range.

Figure 2:
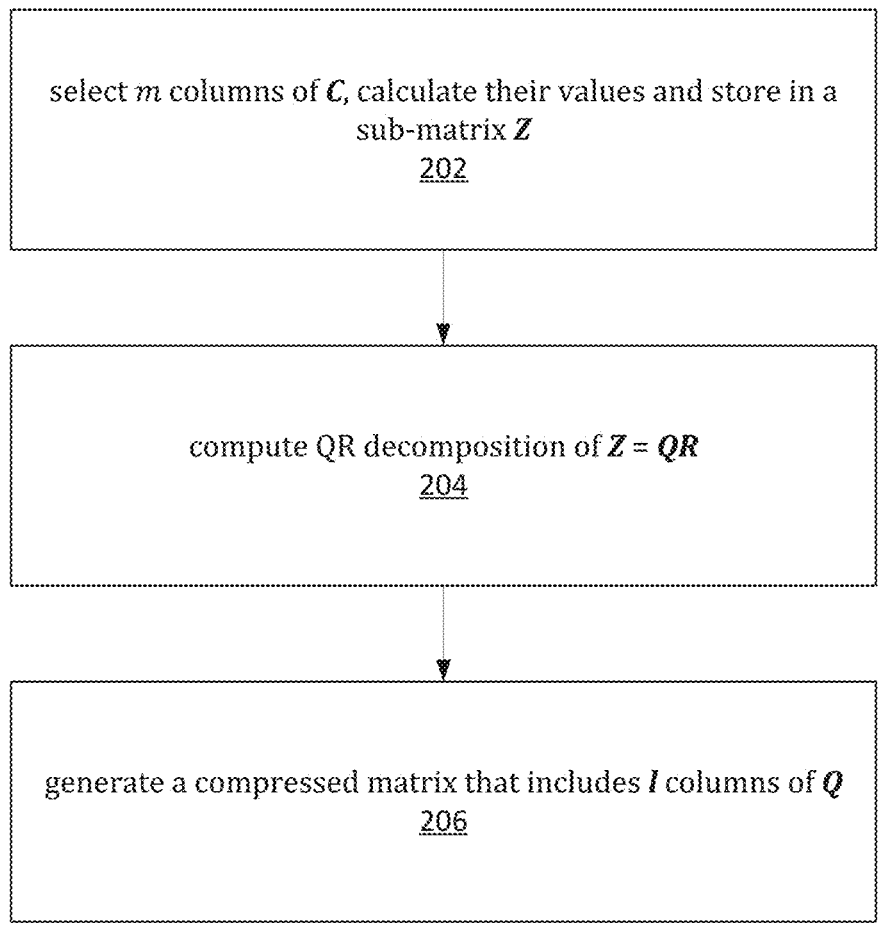
FIG. 2 illustrates a process for decomposition of a multiple input multiple output (MIMO, e.g., mMIMO) channel covariance matrix, in accordance with various embodiments.

FIG. 2 illustrates one example process 200 in accordance with various embodiments. At 202, the process 200 may include to select m columns of C, calculate their values and store in a sub-matrix $Z \in \mathbb{C}^{n \times m}$. The value of m may be less than the total number of columns, n, in C. In some embodiments, the columns of C to be copied in Z may be randomly or deterministically (e.g. equidistant columns or first m columns) chosen.

At 204, the process 200 may further include to compute QR decomposition of Z=QR.

At 206, the process 200 may further include to generate a compressed matrix that includes l columns of Q (e.g., $Q_{:,l} \in \mathbb{C}^{l \times m}$). In some embodiments, the l columns may be the first l columns.

Accordingly, the range of R from the QR decomposition is given by the output of process 200 (e.g., the first l columns of Q).

In some embodiments, instead of using a general QR decomposition, a sorted QR decomposition algorithm may be used (see e.g., D. Wübben, R. Böhnke, J. Rinas, V. Kühn, and K.-D. Kammeyer, "Efficient algorithm for decoding layered space-time codes," IEE Electronics Letters, vol. 37, no. 22, pp. 1348-1350, October 2001). This may be beneficial if the targeted compression m is smaller than the rank of C.

Figure 3:
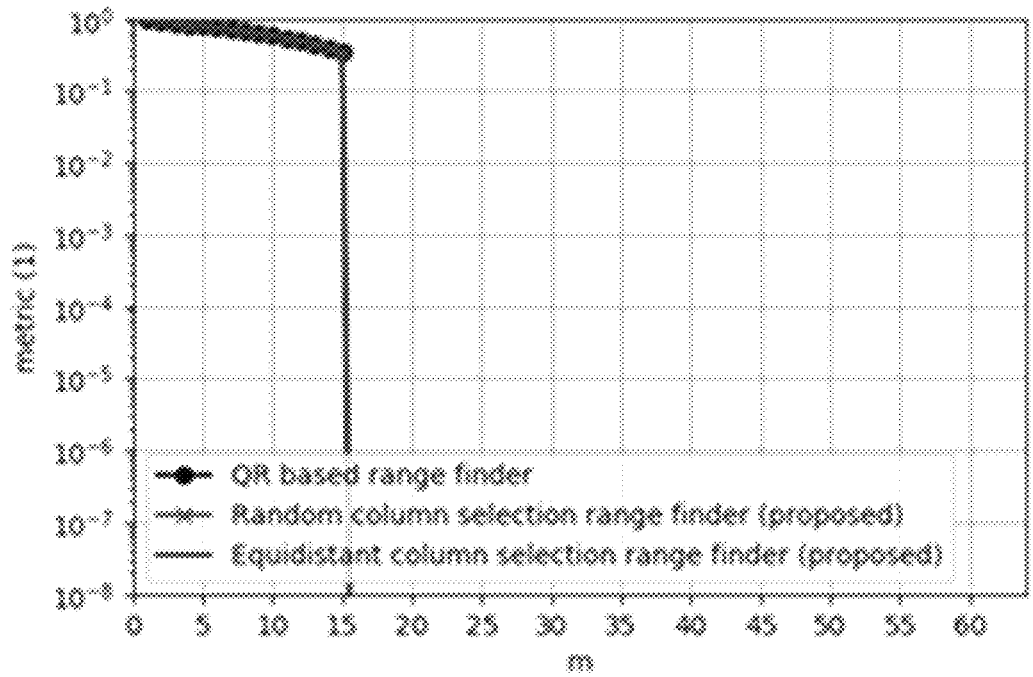
FIG. 3 illustrates a range approximation metric (1) over compression m for a rank 16 matrix with three different range approximation techniques, in accordance with various embodiments.
Figure 4:
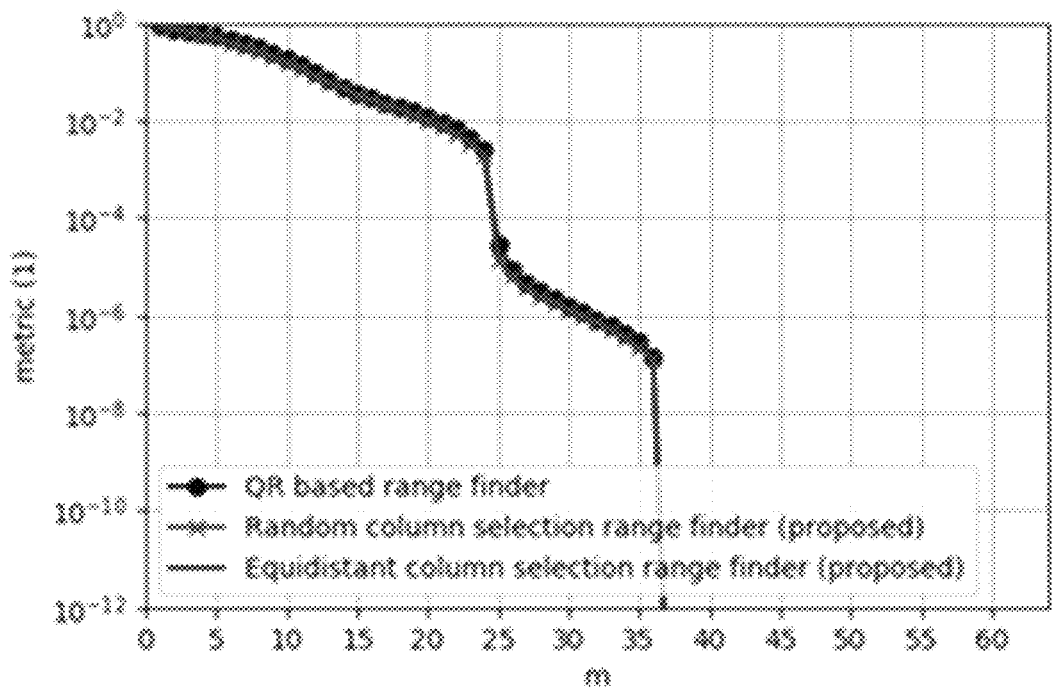
FIG. 4 illustrates a range approximation metric (1) over compression m for a full rank matrix with fast decaying singular values using three different range approximation techniques, in accordance with various embodiments.

FIGS. 3 and 4 illustrate plots to compare the metric defined in equation (1) for different range estimation approaches. A value of l=m was used for the plots, but generally values of l≤m may be used. FIG. 3 is for a matrix C given by a random 64×64 matrix with rank 16, while FIG. 4 is for a matrix C given by a random 64×64 matrix with full rank but fast decaying singular values. The plots in FIGS. 3 and 4 show a comparison of three approaches. "QR based range finder" uses the full QR decomposition of C to find the range. "Random column selection" computes the QR of m random columns of C. "Equidistant column selection" uses m columns picked equidistant starting with the first. As shown, all three approaches have similar performance.

In various embodiments, the process 200 provides significantly reduced computational complexity compared with a range finder that uses a QR decomposition of the entire matrix C. For example, Table 1 shows the approximate relative cycle counts for different number of columns retained in a covariance matrix in the case of 64 antennas.

TABLE 1

| | |
|---|---|
| Full QR of matrix C (64 columns) | 1 |
| Process 200 (l = m = 32 columns) | 0.25 |
| Process 200 (l = m = 16 columns) | .0625 |

Three example embodiments are described in more detail below. The embodiments may employ the techniques described herein to approximate a channel covariance matrix for mMIMO based on a low-rank matrix. For example, the embodiments may employ aspects of the process 200 described above. Accordingly, the embodiments may reduce computational complexity compared with prior techniques while also providing accurate channel estimation and/or accurate beamforming weight calculation. The three embodiments described below are merely examples, and the techniques described herein for efficient decomposition of a channel covariance matrix may be applied to other aspects of mMIMO communications in accordance with various embodiments.

Embodiment 1: mMIMO Channel Estimation Based on Sounding Reference Signals (SRS)

For mMIMO, uplink channel estimation based on SRS is a computationally expensive task. In a MIMO system with a small number of antennas the channels are estimated for each antenna. In the mMIMO regime this approach does not scale. For example, estimating the channels per antenna may result in excessive computational complexity.

Using the techniques described herein (e.g., the process 200), the computational complexity may be reduced significantly. For example, an initial compression operation may be used to reduce computational complexity of user separation and channel estimation.

Figure 5:
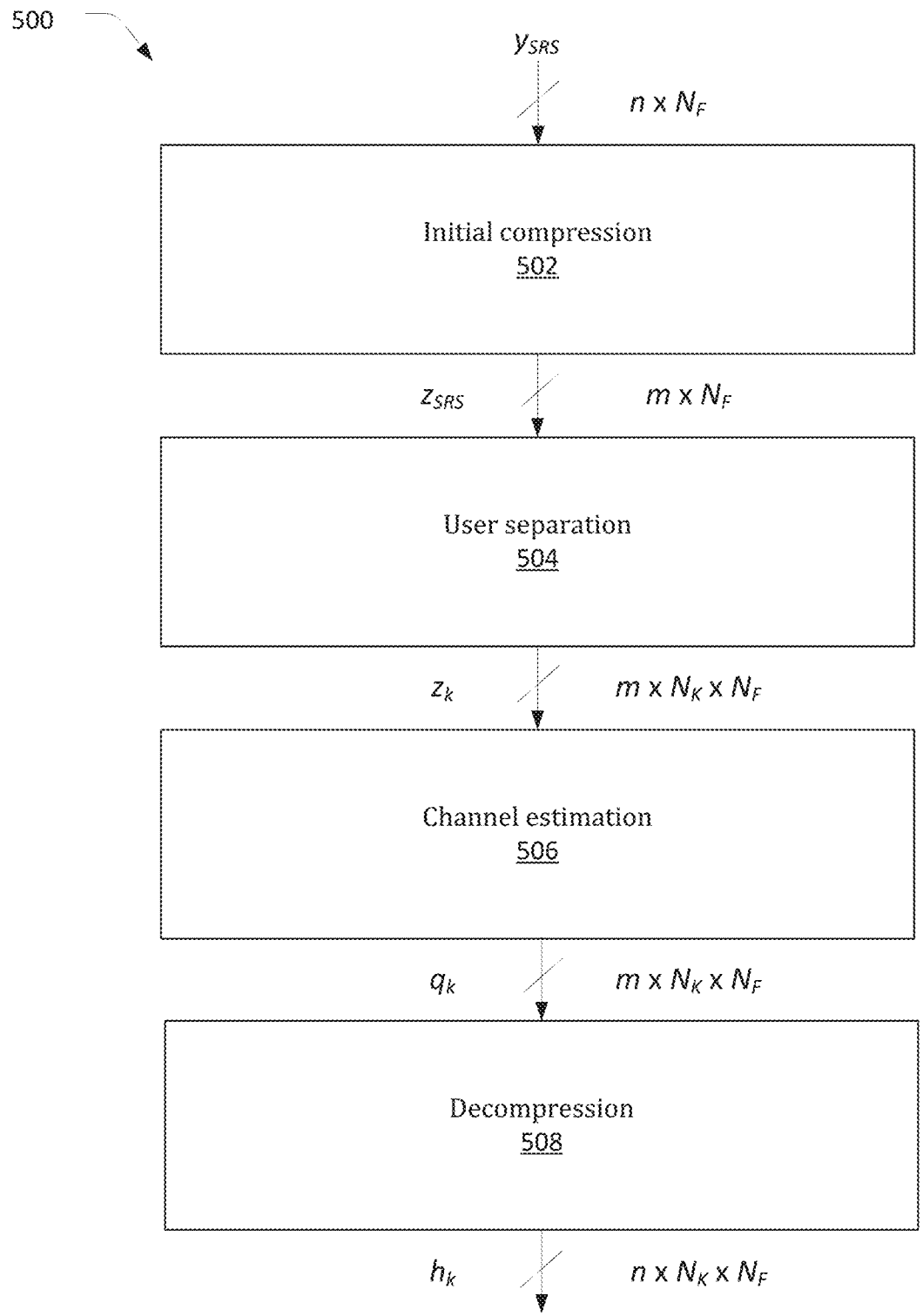
FIG. 5 illustrates a process for uplink channel estimation based on sounding reference signals (SRSs), in accordance with various embodiments.

FIG. 5 illustrates a process 500 for uplink channel estimation based on SRS, in accordance with various embodiments.

At 502 of the process 500, an initial compression is performed of the covariance matrix $C_{SRS}$ of the received signal $y_{SRS}$. For example, the process 200 may be used to obtain Q from covariance matrix $C_{SRS}$. The covariance matrix $C_{SRS}$ may be given by:

$$C_{SRS} = \sum_{f \in F} y_{SRS}[f] y_{SRS}[f]^H$$

The received signal $y_{SRS}$ may compressed in the spatial domain. For example, n physical antennas may be compressed to m virtual antennas, yielding:

$$z_{SRS}[f] = Q^H y_{SRS}[f]$$

where f corresponds to the pilot subcarriers.

At 504 of the process 500, the users are separated. The user separation may treat the compressed matrix Q as part of the channel, yielding $$z_k[f] = Q^H h_k[f] + n$$

with f pilot subcarriers and k the user index.

At 506 of the process 500, the compressed channels are estimated. For example, the estimation may yield:

$$q_k[f_d] \approx Q^H h_k[f_d]$$

with $f_d$ relevant data subcarriers.

At 508 of the process 500, the channel estimates are decompressed. For example, the decompression may yield:

$$h_k[f_d] = QQ^H h_l[f_d].$$

In some embodiments, the decompression at 508 may use linear decompression, as shown. The linear decompression may be most feasible computationally. However, other decompression techniques, including non-linear techniques, may be used.

Figure 6:
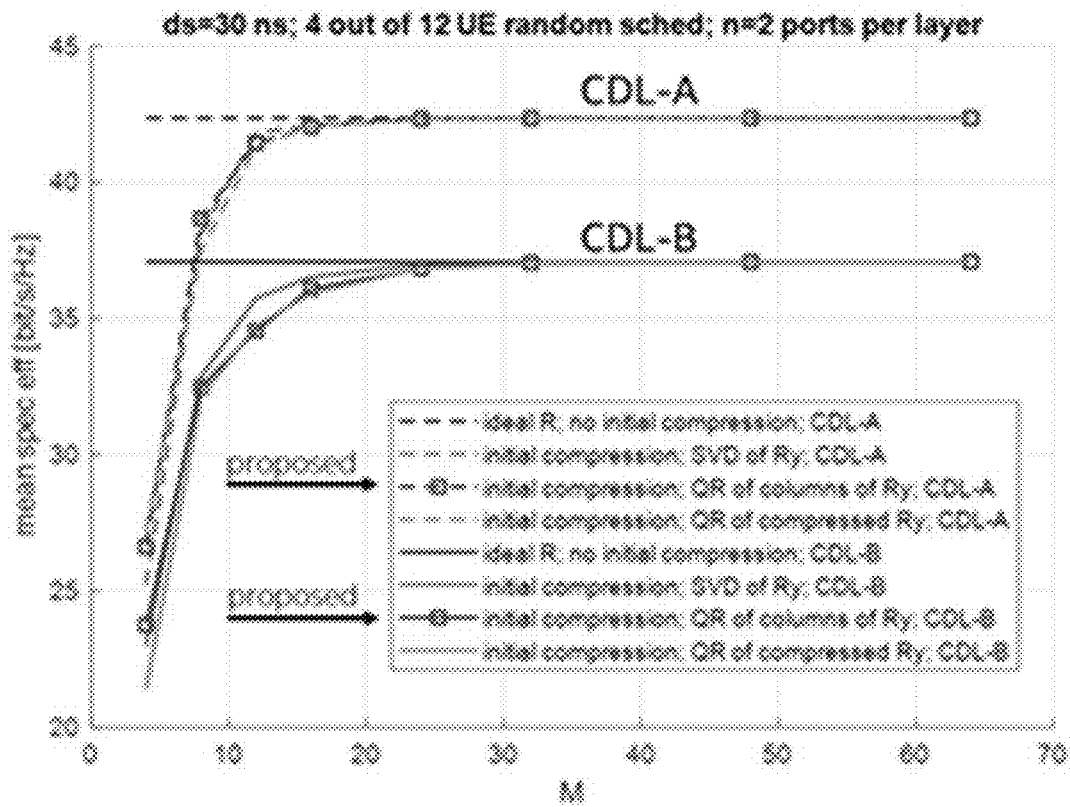
FIG. 6 illustrates a comparison of mean spectral efficiency for different compression levels associated with the process of FIG. 5, in accordance with various embodiments.

FIG. 6 shows a comparison of the mean spectral efficiency for different compression levels M=m. The plots use a 3GPP channel model and include results for clustered delay line (CDL)-A and CDL-B channel profiles. The simulation setup is summarized in the table below the plots of FIG. 6. The performance without any initial compression is shown by the flat lines. The plots that correspond to the techniques described herein are marked with boxes. With initial compression, the spectral efficiency converges rapidly towards the upper bound (e.g., no initial compression). For CDL-A m=16 is sufficient to achieve optimal performance. CDL-B can be compressed to m=24 without significant performance degradation.

Hence, initial compression allows the problem size to be reduced up to 4-fold in the considered examples. As the number of antennas grows, even larger gains can be realized.

Furthermore, the plots demonstrate that initial compression based on the column selection-based QR described herein performs very close to SVD-based initial compression, which is significantly more complex.

Embodiment 2: mMIMO Apatial Compression

Figure 7:
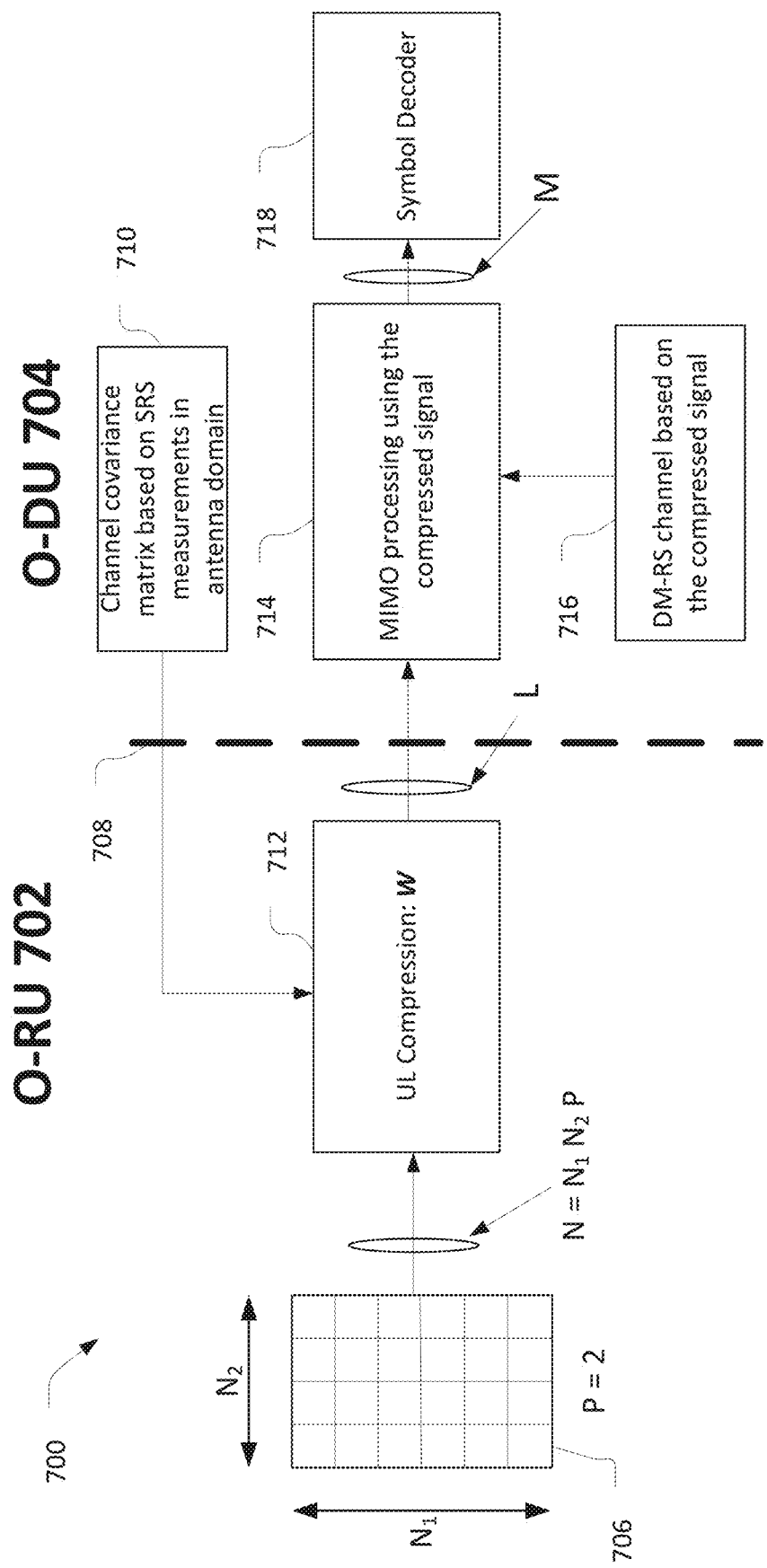
FIG. 7 illustrates a spatial compression process 700 in accordance with various embodiments.

FIG. 7 illustrates a spatial compression process 700 in accordance with various embodiments. Aspects of the process 700 may be performed by an open RU (O-RU) 702 and/or an open DU (O-DU) 704. The O-RU 702 may include an antenna array 706 with N elements to receive M data layers from UEs served by the O-RU 702. The N elements may correspond to the number of TXRUs (e.g., N1×N2 for a rectangular antenna array) multiplied by a number of polarizations of the TXRUs (e.g., 2 polarizations, such as vertical and horizontal).

Spatial compression reduces the spatial dimensions of the data and control channels (e.g. physical uplink shared channel (PUSCH), physical uplink control channel (PUCCH)). For O-RAN based 5G New Radio (NR) base station architecture, as shown in FIG. 7, this means less fronthaul traffic (through fronthaul interface 708) from O-RU 702 to O-DU 704. At 710, the uplink channel between each UE and each received antenna is estimated in O-DU 704 using the SRS in the uplink (UL) signal, e.g., using process 500 of Embodiment 1. Following that, channel covariance matrix per UE may be calculated as described previously herein. The O-DU 704 may provide the computed beamforming weights (also referred to as spatial compression weights) from the decomposition of the channel covariance matrix to the O-RU 702.

For multiple UEs, the overall covariance matrix may be calculated as a weighted sum of individual UE covariance matrices, $$C = \sum_{k} \rho_k C_k, \text{ where } \rho_k = \frac{1}{\sqrt{Tr(C_k)}}$$

is used for fair combining of UEs. Alternatively the overall covariance matrix may be calculated per equation (1) but replacing $h_k(s) \in \mathbb{c}^{n \times t}$ with a channel matrix aggregated over all users $h(s) \in \mathbb{c}^{n \times L}$. The rank of the covariance matrix is generally determined by the combined rank of all the UEs, denoted here as L, multiplexed in a given resource block.

Accordingly, in various embodiments, L number of columns may be selected from the covariance matrix (e.g., using one of the strategies described herein) to create a sub-matrix, C'. The QR decomposition of C' gives the beamforming weights, W, as the first L columns of the Q matrix. In some embodiments, compute cycles may be saved by not calculating the entire covariance matrix C, but only the columns that are used for the sub-matrix C' that is used in the QR decomposition operation. In some embodiments, these operations may be performed in the O-DU 704. Alternatively, aspects may be performed in the O-RU 702. The O-RU 702 may perform spatial compression of the received signal based on the determined beamforming weights, and provide the compressed signal to the O-DU 704 for further processing.

For example, at 714, the O-DU 704 may perform MIMO processing on the compressed signal. In embodiments, the O-DU 704 may determine the DM-RS channel based on the compressed signal (shown at 716) and perform MIMO processing based on the DM-RS channel. The processed signal may be passed to a symbol decoder 718 to decode the data that is encoded in the processed signal.

Embodiment 3: Efficient Uplink or Downlink Beamforming Weight Calculation from a Covariance Matrix Another application of the techniques described herein is beamforming weight calculation for the uplink or downlink of a mMIMO system. As an example, assume a wireless node estimated the channel covariance matrix $C_k$ for user k. Using the techniques described herein (e.g., the process 200), the desired downlink or uplink beamforming weights may be computed while reducing computational complexity.

For example, the estimated channel covariance matrix may be compressed by selecting a subset of columns, and the beamforming weights may be computed based on the compressed matrix.

Systems and Implementations

FIGS. 8-12 illustrate various systems, devices, and components that may implement aspects of disclosed embodiments.

Figure 8:
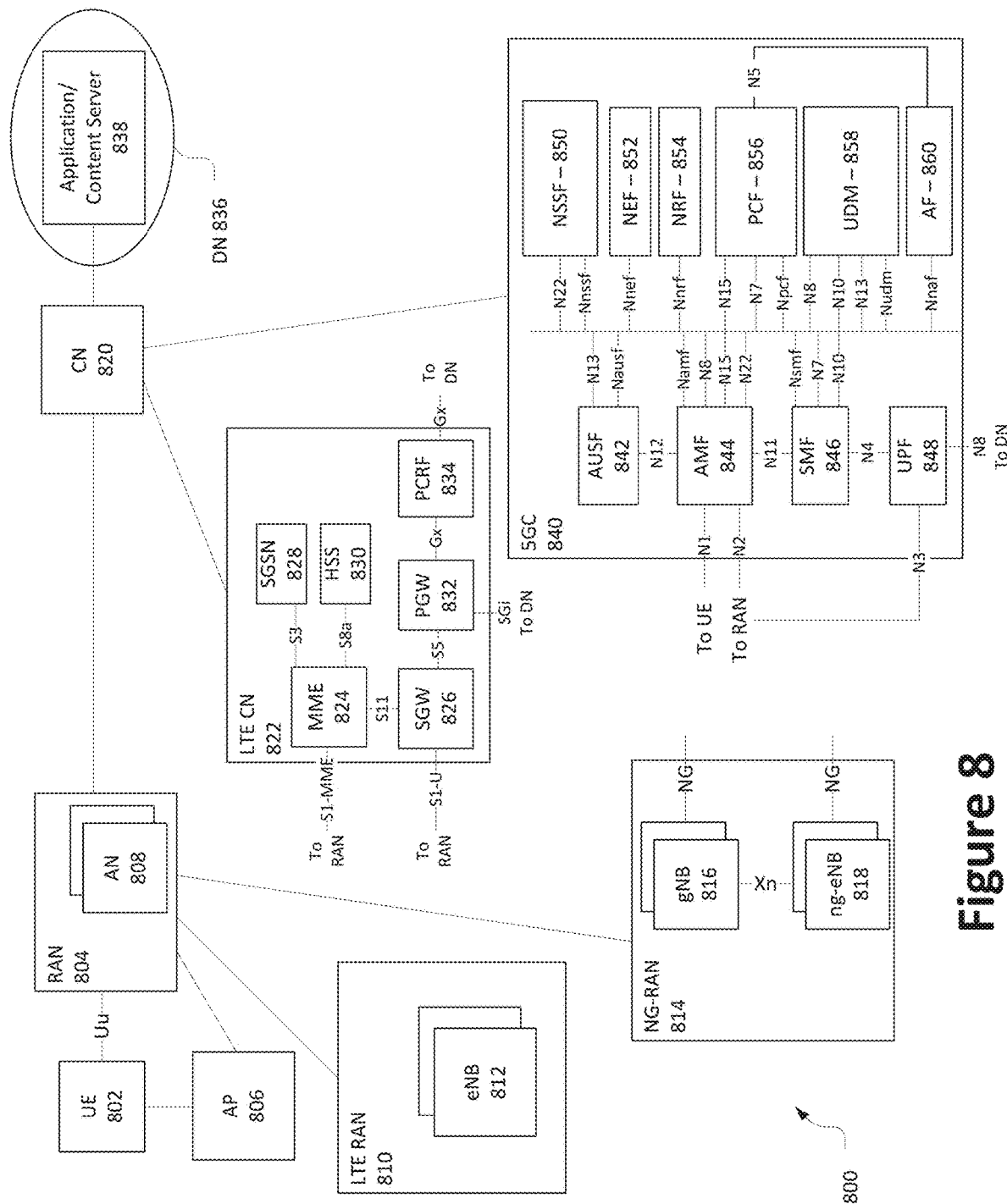
FIG. 8 illustrates a network environment in accordance with various embodiments.

FIG. 8 illustrates a network 800 in accordance with various embodiments. The network 800 may operate in a manner consistent with 3GPP technical specifications for LTE or 5G/NR systems. However, the example embodiments are not limited in this regard and the described embodiments may apply to other networks that benefit from the principles described herein, such as future 3GPP systems, or the like.

The network 800 may include a UE 802, which may include any mobile or non-mobile computing device designed to communicate with a RAN 804 via an over-the-air connection. The UE 802 may be communicatively coupled with the RAN 804 by a Uu interface. The UE 802 may be, but is not limited to, a smartphone, tablet computer, wearable computer device, desktop computer, laptop computer, in-vehicle infotainment, in-car entertainment device, instrument cluster, head-up display device, onboard diagnostic device, dashtop mobile equipment, mobile data terminal, electronic engine management system, electronic/engine control unit, electronic/engine control module, embedded system, sensor, microcontroller, control module, engine management system, networked appliance, machine-type communication device, M2M or D2D device, IoT device, etc.

In some embodiments, the network 800 may include a plurality of UEs coupled directly with one another via a sidelink interface. The UEs may be M2M/D2D devices that communicate using physical sidelink channels such as, but not limited to, PSBCH, PSDCH, PSSCH, PSCCH, PSFCH, etc.

In some embodiments, the UE 802 may additionally communicate with an AP 806 via an over-the-air connection. The AP 806 may manage a WLAN connection, which may serve to offload some/all network traffic from the RAN 804. The connection between the UE 802 and the AP 806 may be consistent with any IEEE 802.11 protocol, wherein the AP 806 could be a wireless fidelity (Wi-Fi®) router. In some embodiments, the UE 802, RAN 804, and AP 806 may utilize cellular-WLAN aggregation (for example, LWA/LWIP). Cellular-WLAN aggregation may involve the UE 802 being configured by the RAN 804 to utilize both cellular radio resources and WLAN resources.

The RAN 804 may include one or more access nodes, for example, AN 808. AN 808 may terminate air-interface protocols for the UE 802 by providing access stratum protocols including RRC, PDCP, RLC, MAC, and L1 protocols. In this manner, the AN 808 may enable data/voice connectivity between CN 820 and the UE 802. In some embodiments, the AN 808 may be implemented in a discrete device or as one or more software entities running on server computers as part of, for example, a virtual network, which may be referred to as a CRAN or virtual baseband unit pool. The AN 808 be referred to as a BS, gNB, RAN node, eNB, ng-eNB, NodeB, RSU, TRxP, TRP, etc. The AN 808 may be a macrocell base station or a low power base station for providing femtocells, picocells or other like cells having smaller coverage areas, smaller user capacity, or higher bandwidth compared to macrocells.

In embodiments in which the RAN 804 includes a plurality of ANs, they may be coupled with one another via an X2 interface (if the RAN 804 is an LTE RAN) or an Xn interface (if the RAN 804 is a 5G RAN). The X2/Xn interfaces, which may be separated into control/user plane interfaces in some embodiments, may allow the ANs to communicate information related to handovers, data/context transfers, mobility, load management, interference coordination, etc.

The ANs of the RAN 804 may each manage one or more cells, cell groups, component carriers, etc. to provide the UE 802 with an air interface for network access. The UE 802 may be simultaneously connected with a plurality of cells provided by the same or different ANs of the RAN 804. For example, the UE 802 and RAN 804 may use carrier aggregation to allow the UE 802 to connect with a plurality of component carriers, each corresponding to a Pcell or Scell. In dual connectivity scenarios, a first AN may be a master node that provides an MCG and a second AN may be secondary node that provides an SCG. The first/second ANs may be any combination of eNB, gNB, ng-eNB, etc.

The RAN 804 may provide the air interface over a licensed spectrum or an unlicensed spectrum. To operate in the unlicensed spectrum, the nodes may use LAA, eLAA, and/or feLAA mechanisms based on CA technology with PCells/Scells. Prior to accessing the unlicensed spectrum, the nodes may perform medium/carrier-sensing operations based on, for example, a listen-before-talk (LBT) protocol.

In V2X scenarios the UE 802 or AN 808 may be or act as a RSU, which may refer to any transportation infrastructure entity used for V2X communications. An RSU may be implemented in or by a suitable AN or a stationary (or relatively stationary) UE. An RSU implemented in or by: a UE may be referred to as a "UE-type RSU"; an eNB may be referred to as an "eNB-type RSU"; a gNB may be referred to as a "gNB-type RSU"; and the like. In one example, an RSU is a computing device coupled with radio frequency circuitry located on a roadside that provides connectivity support to passing vehicle UEs. The RSU may also include internal data storage circuitry to store intersection map geometry, traffic statistics, media, as well as applications/software to sense and control ongoing vehicular and pedestrian traffic. The RSU may provide very low latency communications required for high speed events, such as crash avoidance, traffic warnings, and the like. Additionally or alternatively, the RSU may provide other cellular/WLAN communications services. The components of the RSU may be packaged in a weatherproof enclosure suitable for outdoor installation, and may include a network interface controller to provide a wired connection (e.g., Ethernet) to a traffic signal controller or a backhaul network.

In some embodiments, the RAN 804 may be an LTE RAN 810 with eNBs, for example, eNB 812. The LTE RAN 810 may provide an LTE air interface with the following characteristics: SCS of 15 kHz; CP-OFDM waveform for DL and SC-FDMA waveform for UL; turbo codes for data and TBCC for control; etc. The LTE air interface may rely on CSI-RS for CSI acquisition and beam management; PDSCH/PDCCH DMRS for PDSCH/PDCCH demodulation; and CRS for cell search and initial acquisition, channel quality measurements, and channel estimation for coherent demodulation/detection at the UE. The LTE air interface may operating on sub-6 GHz bands.

In some embodiments, the RAN 804 may be an NG-RAN 814 with gNBs, for example, gNB 816, or ng-eNBs, for example, ng-eNB 818. The gNB 816 may connect with 5G-enabled UEs using a 5G NR interface. The gNB 816 may connect with a 5G core through an NG interface, which may include an N2 interface or an N3 interface. The ng-eNB 818 may also connect with the 5G core through an NG interface, but may connect with a UE via an LTE air interface. The gNB 816 and the ng-eNB 818 may connect with each other over an Xn interface.

In some embodiments, the NG interface may be split into two parts, an NG user plane (NG-U) interface, which carries traffic data between the nodes of the NG-RAN 814 and a UPF 848 (e.g., N3 interface), and an NG control plane (NG-C) interface, which is a signaling interface between the nodes of the NG-RAN 814 and an AMF 844 (e.g., N2 interface).

The NG-RAN 814 may provide a 5G-NR air interface with the following characteristics: variable SCS; CP-OFDM for DL, CP-OFDM and DFT-s-OFDM for UL; polar, repetition, simplex, and Reed-Muller codes for control and LDPC for data. The 5G-NR air interface may rely on CSI-RS, PDSCH/PDCCH DMRS similar to the LTE air interface. The 5G-NR air interface may not use a CRS, but may use PBCH DMRS for PBCH demodulation; PTRS for phase tracking for PDSCH; and tracking reference signal for time tracking. The 5G-NR air interface may operating on FR1 bands that include sub-6 GHz bands or FR2 bands that include bands from 24.25 GHz to 52.6 GHz. The 5G-NR air interface may include an SSB that is an area of a downlink resource grid that includes PSS/SSS/PBCH.

In some embodiments, the 5G-NR air interface may utilize BWPs for various purposes. For example, BWP can be used for dynamic adaptation of the SCS. For example, the UE 802 can be configured with multiple BWPs where each BWP configuration has a different SCS. When a BWP change is indicated to the UE 802, the SCS of the transmission is changed as well. Another use case example of BWP is related to power saving. In particular, multiple BWPs can be configured for the UE 802 with different amount of frequency resources (for example, PRBs) to support data transmission under different traffic loading scenarios. A BWP containing a smaller number of PRBs can be used for data transmission with small traffic load while allowing power saving at the UE 802 and in some cases at the gNB 816. A BWP containing a larger number of PRBs can be used for scenarios with higher traffic load.

The RAN 804 is communicatively coupled to CN 820 that includes network elements to provide various functions to support data and telecommunications services to customers/subscribers (for example, users of UE 802). The components of the CN 820 may be implemented in one physical node or separate physical nodes. In some embodiments, NFV may be utilized to virtualize any or all of the functions provided by the network elements of the CN 820 onto physical compute/storage resources in servers, switches, etc. A logical instantiation of the CN 820 may be referred to as a network slice, and a logical instantiation of a portion of the CN 820 may be referred to as a network sub-slice.

In some embodiments, the CN 820 may be an LTE CN 822, which may also be referred to as an EPC. The LTE CN 822 may include MME 824, SGW 826, SGSN 828, HSS 830, PGW 832, and PCRF 834 coupled with one another over interfaces (or "reference points") as shown. Functions of the elements of the LTE CN 822 may be briefly introduced as follows.

The MME 824 may implement mobility management functions to track a current location of the UE 802 to facilitate paging, bearer activation/deactivation, handovers, gateway selection, authentication, etc.

The SGW 826 may terminate an S1 interface toward the RAN and route data packets between the RAN and the LTE CN 822. The SGW 826 may be a local mobility anchor point for inter-RAN node handovers and also may provide an anchor for inter-3GPP mobility. Other responsibilities may include lawful intercept, charging, and some policy enforcement.

The SGSN 828 may track a location of the UE 802 and perform security functions and access control. In addition, the SGSN 828 may perform inter-EPC node signaling for mobility between different RAT networks; PDN and S-GW selection as specified by MME 824; MME selection for handovers; etc. The S3 reference point between the MME 824 and the SGSN 828 may enable user and bearer information exchange for inter-3GPP access network mobility in idle/active states.

The HSS 830 may include a database for network users, including subscription-related information to support the network entities' handling of communication sessions. The HSS 830 can provide support for routing/roaming, authentication, authorization, naming/addressing resolution, location dependencies, etc. An S6a reference point between the HSS 830 and the MME 824 may enable transfer of subscription and authentication data for authenticating/authorizing user access to the LTE CN 820.

The PGW 832 may terminate an SGi interface toward a data network (DN) 836 that may include an application/content server 838. The PGW 832 may route data packets between the LTE CN 822 and the data network 836. The PGW 832 may be coupled with the SGW 826 by an S5 reference point to facilitate user plane tunneling and tunnel management. The PGW 832 may further include a node for policy enforcement and charging data collection (for example, PCEF). Additionally, the SGi reference point between the PGW 832 and the data network 836 may be an operator external public, a private PDN, or an intra-operator packet data network, for example, for provision of IMS services. The PGW 832 may be coupled with a PCRF 834 via a Gx reference point.

The PCRF 834 is the policy and charging control element of the LTE CN 822. The PCRF 834 may be communicatively coupled to the app/content server 838 to determine appropriate QoS and charging parameters for service flows. The PCRF 832 may provision associated rules into a PCEF (via Gx reference point) with appropriate TFT and QCI.

In some embodiments, the CN 820 may be a 5GC 840. The 5GC 840 may include an AUSF 842, AMF 844, SMF 846, UPF 848, NSSF 850, NEF 852, NRF 854, PCF 856, UDM 858, and AF 860 coupled with one another over interfaces (or "reference points") as shown. Functions of the elements of the 5GC 840 may be briefly introduced as follows.

The AUSF 842 may store data for authentication of UE 802 and handle authentication-related functionality. The AUSF 842 may facilitate a common authentication framework for various access types. In addition to communicating with other elements of the 5GC 840 over reference points as shown, the AUSF 842 may exhibit an Nausf service-based interface.

The AMF 844 may allow other functions of the 5GC 840 to communicate with the UE 802 and the RAN 804 and to subscribe to notifications about mobility events with respect to the UE 802. The AMF 844 may be responsible for registration management (for example, for registering UE 802), connection management, reachability management, mobility management, lawful interception of AMF-related events, and access authentication and authorization. The AMF 844 may provide transport for SM messages between the UE 802 and the SMF 846, and act as a transparent proxy for routing SM messages. AMF 844 may also provide transport for SMS messages between UE 802 and an SMSF. AMF 844 may interact with the AUSF 842 and the UE 802 to perform various security anchor and context management functions. Furthermore, AMF 844 may be a termination point of a RAN CP interface, which may include or be an N2 reference point between the RAN 804 and the AMF 844; and the AMF 844 may be a termination point of NAS (N1) signaling, and perform NAS ciphering and integrity protection. AMF 844 may also support NAS signaling with the UE 802 over an N3 IWF interface.

The SMF 846 may be responsible for SM (for example, session establishment, tunnel management between UPF 848 and AN 808); UE IP address allocation and management (including optional authorization); selection and control of UP function; configuring traffic steering at UPF 848 to route traffic to proper destination; termination of interfaces toward policy control functions; controlling part of policy enforcement, charging, and QoS; lawful intercept (for SM events and interface to LI system); termination of SM parts of NAS messages; downlink data notification; initiating AN specific SM information, sent via AMF 844 over N2 to AN 808; and determining SSC mode of a session. SM may refer to management of a PDU session, and a PDU session or "session" may refer to a PDU connectivity service that provides or enables the exchange of PDUs between the UE 802 and the data network 836.

The UPF 848 may act as an anchor point for intra-RAT and inter-RAT mobility, an external PDU session point of interconnect to data network 836, and a branching point to support multi-homed PDU session. The UPF 848 may also perform packet routing and forwarding, perform packet inspection, enforce the user plane part of policy rules, lawfully intercept packets (UP collection), perform traffic usage reporting, perform QoS handling for a user plane (e.g., packet filtering, gating, UL/DL rate enforcement), perform uplink traffic verification (e.g., SDF-to-QoS flow mapping), transport level packet marking in the uplink and downlink, and perform downlink packet buffering and downlink data notification triggering. UPF 848 may include an uplink classifier to support routing traffic flows to a data network.

The NSSF 850 may select a set of network slice instances serving the UE 802. The NSSF 850 may also determine allowed NSSAI and the mapping to the subscribed S-NSSAIs, if needed. The NSSF 850 may also determine the AMF set to be used to serve the UE 802, or a list of candidate AMFs based on a suitable configuration and possibly by querying the NRF 854. The selection of a set of network slice instances for the UE 802 may be triggered by the AMF 844 with which the UE 802 is registered by interacting with the NSSF 850, which may lead to a change of AMF. The NSSF 850 may interact with the AMF 844 via an N22 reference point; and may communicate with another NSSF in a visited network via an N31 reference point (not shown). Additionally, the NSSF 850 may exhibit an Nnssf service-based interface.

The NEF 852 may securely expose services and capabilities provided by 3GPP network functions for third party, internal exposure/re-exposure, AFs (e.g., AF 860), edge computing or fog computing systems, etc. In such embodiments, the NEF 852 may authenticate, authorize, or throttle the AFs. NEF 852 may also translate information exchanged with the AF 860 and information exchanged with internal network functions. For example, the NEF 852 may translate between an AF-Service-Identifier and an internal 5GC information. NEF 852 may also receive information from other NFs based on exposed capabilities of other NFs. This information may be stored at the NEF 852 as structured data, or at a data storage NF using standardized interfaces. The stored information can then be re-exposed by the NEF 852 to other NFs and AFs, or used for other purposes such as analytics. Additionally, the NEF 852 may exhibit an Nnef service-based interface.

The NRF 854 may support service discovery functions, receive NF discovery requests from NF instances, and provide the information of the discovered NF instances to the NF instances. NRF 854 also maintains information of available NF instances and their supported services. As used herein, the terms "instantiate," "instantiation," and the like may refer to the creation of an instance, and an "instance" may refer to a concrete occurrence of an object, which may occur, for example, during execution of program code. Additionally, the NRF 854 may exhibit the Nnrf service-based interface.

The PCF 856 may provide policy rules to control plane functions to enforce them, and may also support unified policy framework to govern network behavior. The PCF 856 may also implement a front end to access subscription information relevant for policy decisions in a UDR of the UDM 858. In addition to communicating with functions over reference points as shown, the PCF 856 exhibit an Npcf service-based interface.

The UDM 858 may handle subscription-related information to support the network entities' handling of communication sessions, and may store subscription data of UE 802. For example, subscription data may be communicated via an N8 reference point between the UDM 858 and the AMF 844. The UDM 858 may include two parts, an application front end and a UDR. The UDR may store subscription data and policy data for the UDM 858 and the PCF 856, and/or structured data for exposure and application data (including PFDs for application detection, application request information for multiple UEs 802) for the NEF 852. The Nudr service-based interface may be exhibited by the UDR 221 to allow the UDM 858, PCF 856, and NEF 852 to access a particular set of the stored data, as well as to read, update (e.g., add, modify), delete, and subscribe to notification of relevant data changes in the UDR. The UDM may include a UDM-FE, which is in charge of processing credentials, location management, subscription management and so on. Several different front ends may serve the same user in different transactions. The UDM-FE accesses subscription information stored in the UDR and performs authentication credential processing, user identification handling, access authorization, registration/mobility management, and subscription management. In addition to communicating with other NFs over reference points as shown, the UDM 858 may exhibit the Nudm service-based interface.

The AF 860 may provide application influence on traffic routing, provide access to NEF, and interact with the policy framework for policy control.

In some embodiments, the 5GC 840 may enable edge computing by selecting operator/$3^{rd}$ party services to be geographically close to a point that the UE 802 is attached to the network. This may reduce latency and load on the network. To provide edge-computing implementations, the 5GC 840 may select a UPF 848 close to the UE 802 and execute traffic steering from the UPF 848 to data network 836 via the N6 interface. This may be based on the UE subscription data, UE location, and information provided by the AF 860. In this way, the AF 860 may influence UPF (re)selection and traffic routing. Based on operator deployment, when AF 860 is considered to be a trusted entity, the network operator may permit AF 860 to interact directly with relevant NFs. Additionally, the AF 860 may exhibit an Naf service-based interface.

The data network 836 may represent various network operator services, Internet access, or third party services that may be provided by one or more servers including, for example, application/content server 838.

Figure 9:
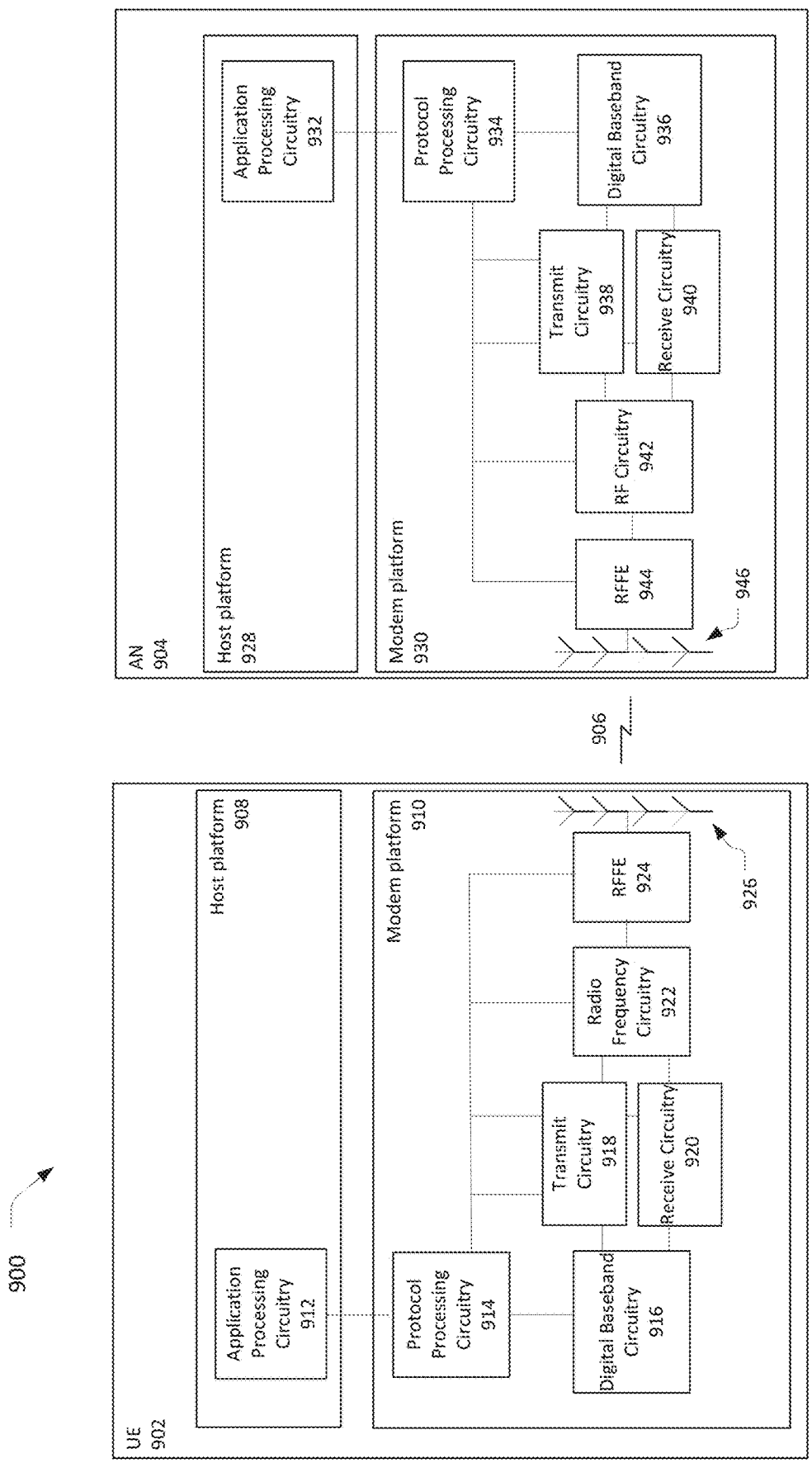
FIG. 9 schematically illustrates a wireless network in accordance with various embodiments.

FIG. 9 schematically illustrates a wireless network 900 in accordance with various embodiments. The wireless network 900 may include a UE 902 in wireless communication with an AN 904. The UE 902 and AN 904 may be similar to, and substantially interchangeable with, like-named components described elsewhere herein.

The UE 902 may be communicatively coupled with the AN 904 via connection 906. The connection 906 is illustrated as an air interface to enable communicative coupling, and can be consistent with cellular communications protocols such as an LTE protocol or a 5G NR protocol operating at mmWave or sub-6GHz frequencies.

The UE 902 may include a host platform 908 coupled with a modem platform 910. The host platform 908 may include application processing circuitry 912, which may be coupled with protocol processing circuitry 914 of the modem platform 910. The application processing circuitry 912 may run various applications for the UE 902 that source/sink application data. The application processing circuitry 912 may further implement one or more layer operations to transmit/receive application data to/from a data network. These layer operations may include transport (for example UDP) and Internet (for example, IP) operations The protocol processing circuitry 914 may implement one or more of layer operations to facilitate transmission or reception of data over the connection 906. The layer operations implemented by the protocol processing circuitry 914 may include, for example, MAC, RLC, PDCP, RRC and NAS operations.

The modem platform 910 may further include digital baseband circuitry 916 that may implement one or more layer operations that are "below" layer operations performed by the protocol processing circuitry 914 in a network protocol stack. These operations may include, for example, PHY operations including one or more of HARQ-ACK functions, scrambling/descrambling, encoding/decoding, layer mapping/de-mapping, modulation symbol mapping, received symbol/bit metric determination, multi-antenna port precoding/decoding, which may include one or more of space-time, space-frequency or spatial coding, reference signal generation/detection, preamble sequence generation and/or decoding, synchronization sequence generation/detection, control channel signal blind decoding, and other related functions.

The modem platform 910 may further include transmit circuitry 918, receive circuitry 920, RF circuitry 922, and RF front end (RFFE) 924, which may include or connect to one or more antenna panels 926. Briefly, the transmit circuitry 918 may include a digital-to-analog converter, mixer, intermediate frequency (IF) components, etc.; the receive circuitry 920 may include an analog-to-digital converter, mixer, IF components, etc.; the RF circuitry 922 may include a low-noise amplifier, a power amplifier, power tracking components, etc.; RFFE 924 may include filters (for example, surface/bulk acoustic wave filters), switches, antenna tuners, beamforming components (for example, phase-array antenna components), etc. The selection and arrangement of the components of the transmit circuitry 918, receive circuitry 920, RF circuitry 922, RFFE 924, and antenna panels 926 (referred generically as "transmit/receive components") may be specific to details of a specific implementation such as, for example, whether communication is TDM or FDM, in mmWave or sub-6 gHz frequencies, etc. In some embodiments, the transmit/receive components may be arranged in multiple parallel transmit/receive chains, may be disposed in the same or different chips/modules, etc.

In some embodiments, the protocol processing circuitry 914 may include one or more instances of control circuitry (not shown) to provide control functions for the transmit/receive components.

A UE reception may be established by and via the antenna panels 926, RFFE 924, RF circuitry 922, receive circuitry 920, digital baseband circuitry 916, and protocol processing circuitry 914. In some embodiments, the antenna panels 926 may receive a transmission from the AN 904 by receive-beamforming signals received by a plurality of antennas/antenna elements of the one or more antenna panels 926.

A UE transmission may be established by and via the protocol processing circuitry 914, digital baseband circuitry 916, transmit circuitry 918, RF circuitry 922, RFFE 924, and antenna panels 926. In some embodiments, the transmit components of the UE 904 may apply a spatial filter to the data to be transmitted to form a transmit beam emitted by the antenna elements of the antenna panels 926.

Similar to the UE 902, the AN 904 may include a host platform 928 coupled with a modem platform 930. The host platform 928 may include application processing circuitry 932 coupled with protocol processing circuitry 934 of the modem platform 930. The modem platform may further include digital baseband circuitry 936, transmit circuitry 938, receive circuitry 940, RF circuitry 942, RFFE circuitry 944, and antenna panels 946. The components of the AN 904 may be similar to and substantially interchangeable with like-named components of the UE 902. In addition to performing data transmission/reception as described above, the components of the AN 908 may perform various logical functions that include, for example, RNC functions such as radio bearer management, uplink and downlink dynamic radio resource management, and data packet scheduling.

Figure 10:
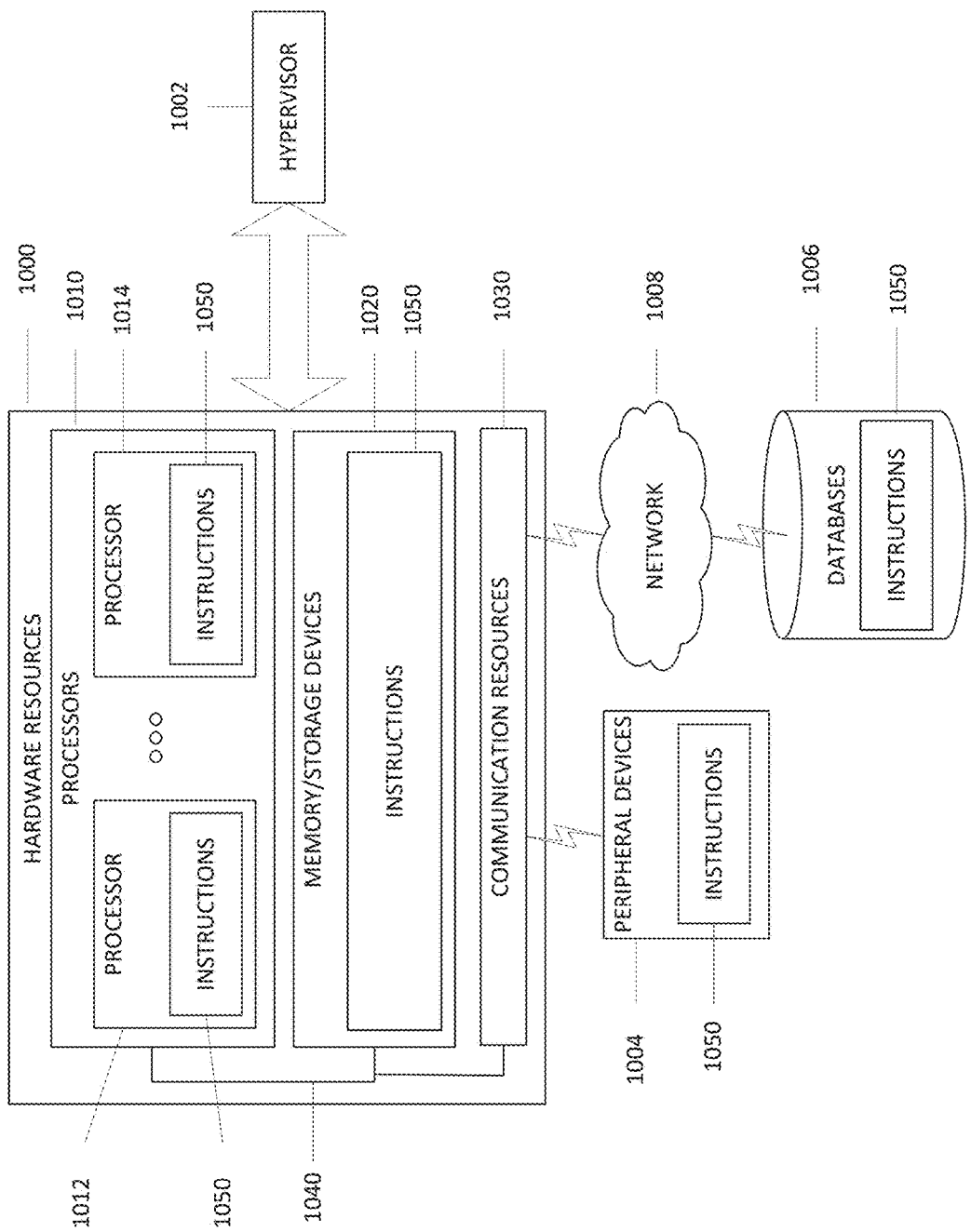
FIG. 10 is a block diagram illustrating components, according to some example embodiments, able to read instructions from a machine-readable or computer-readable medium (e.g., a non-transitory machine-readable storage medium) and perform any one or more of the methodologies discussed herein.

FIG. 10 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 10 shows a diagrammatic representation of hardware resources 1000 including one or more processors (or processor cores) 1010, one or more memory/storage devices 1020, and one or more communication resources 1030, each of which may be communicatively coupled via a bus 1040 or other interface circuitry. For embodiments where node virtualization (e.g., NFV) is utilized, a hypervisor 1002 may be executed to provide an execution environment for one or more network slices/sub-slices to utilize the hardware resources 1000.

The processors 1010 may include, for example, a processor 1012 and a processor 1014. The processors 1010 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 1020 may include main memory, disk storage, or any suitable combination thereof. The memory/storage devices 1020 may include, but are not limited to, any type of volatile, non-volatile, or semi-volatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 1030 may include interconnection or network interface controllers, components, or other suitable devices to communicate with one or more peripheral devices 1004 or one or more databases 1006 or other network elements via a network 1008. For example, the communication resources 1030 may include wired communication components (e.g., for coupling via USB, Ethernet, etc.), cellular communication components, NFC components, Bluetooth® (or Bluetooth® Low Energy) components, Wi-Fi® components, and other communication components.

Instructions 1050 may comprise software, a program, an application, an applet, an app, or other executable code for causing at least any of the processors 1010 to perform any one or more of the methodologies discussed herein. The instructions 1050 may reside, completely or partially, within at least one of the processors 1010 (e.g., within the processor's cache memory), the memory/storage devices 1020, or any suitable combination thereof. Furthermore, any portion of the instructions 1050 may be transferred to the hardware resources 1000 from any combination of the peripheral devices 1004 or the databases 1006. Accordingly, the memory of processors 1010, the memory/storage devices 1020, the peripheral devices 1004, and the databases 1006 are examples of computer-readable and machine-readable media.

Figure 11:
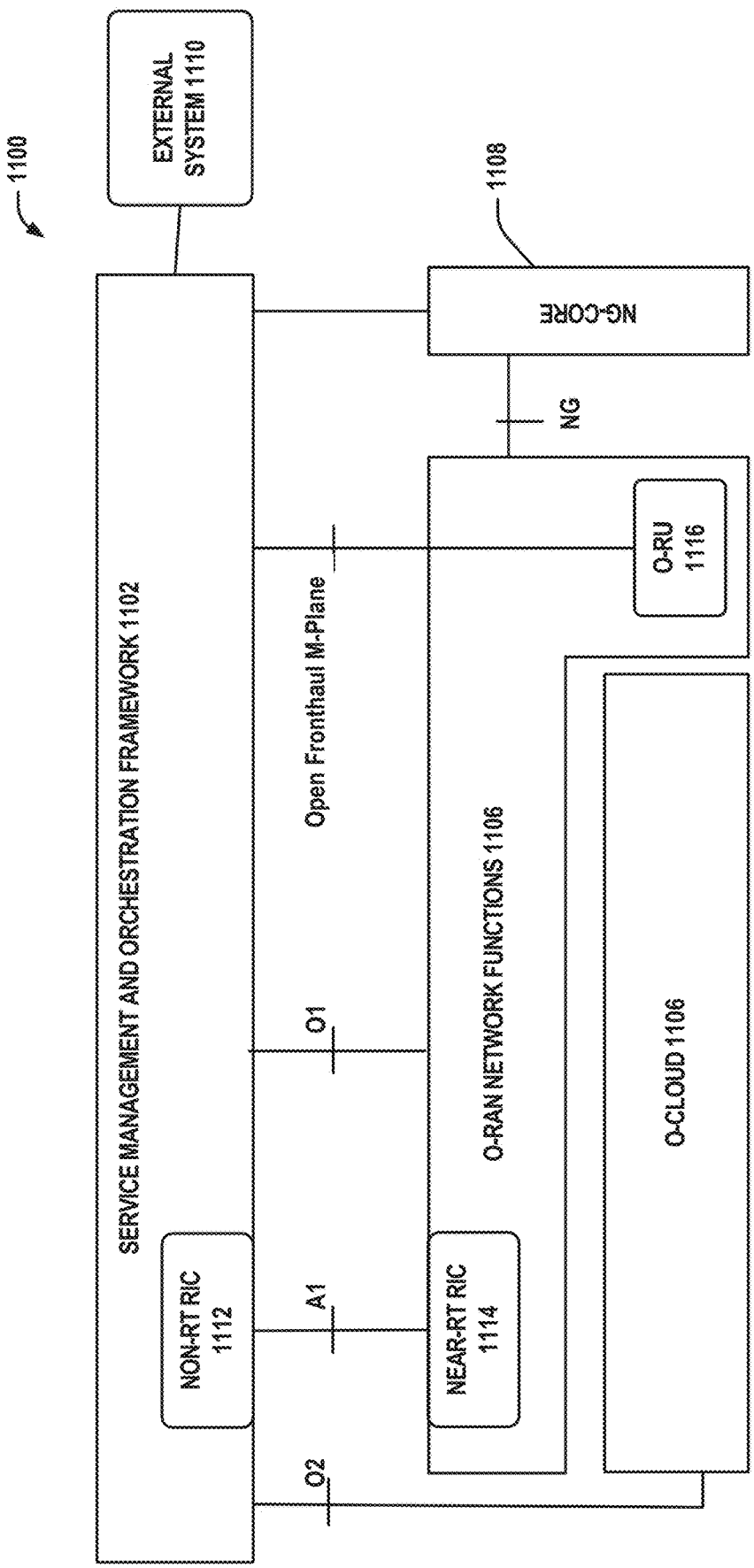
FIG. 11 illustrates an O-RAN architecture in accordance with various embodiments.

FIG. 11 provides a high-level view of an Open RAN (O-RAN) architecture 1100. The O-RAN architecture 1100 includes four O-RAN defined interfaces—namely, the A1 interface, the O1 interface, the O2 interface, and the Open Fronthaul Management (M)-plane interface—which connect the Service Management and Orchestration (SMO) framework 1102 to O-RAN network functions (NFs) 1104 and the O-Cloud 1106. The SMO 1102 (described in O-RAN Alliance Working Group 1, O-RAN Operations and Maintenance Interface Specification, version 2.0 (Dec 2019) ("O-RAN-WG1.O1-Interface-v02.00")) also connects with an external system 1110, which provides enrichment data to the SMO 1102. FIG. 11 also illustrates that the A1 interface terminates at an O-RAN Non-Real Time (RT) RAN Intelligent Controller (RIC) 1112 in or at the SMO 1102 and at the O-RAN Near-RT RIC 1114 in or at the O-RAN NFs 1104. The O-RAN NFs 1104 can be VNFs such as VMs or containers, sitting above the O-Cloud 1106 and/or Physical Network Functions (PNFs) utilizing customized hardware. All O-RAN NFs 1104 are expected to support the O1 interface when interfacing the SMO framework 1102. The O-RAN NFs 1104 connect to the NG-Core 1108 via the NG interface (which is a 3GPP defined interface). The Open Fronthaul M-plane interface between the SMO 1102 and the O-RAN Radio Unit (O-RU) 1116 supports the O-RU 1116 management in the O-RAN hybrid model as specified in O-RAN Alliance Working Group 4, O-RAN Fronthaul Management Plane Specification, version 2.0 (July 2019) ("ORAN-WG4.MP.0-v02.00.00"). The Open Fronthaul M-plane interface is an optional interface to the SMO 1102 that is included for backward compatibility purposes as per ORAN-WG4.MP.0-v02.00.00, and is intended for management of the O-RU 1116 in hybrid mode only. The management architecture of flat mode O-RAN Alliance Working Group 1, O-RAN Operations and Maintenance Architecture Specification, version 2.0 (Dec 2019) ("O-RAN-WG1.OAM-Architecture-v02.00") and its relation to the O1 interface for the O-RU 1116 is for future study. The O-RU 1116 termination of the O1 interface towards the SMO 1102 as specified in O-RAN-WG1.OAM-Architecture-v02.00.

Figure 12:
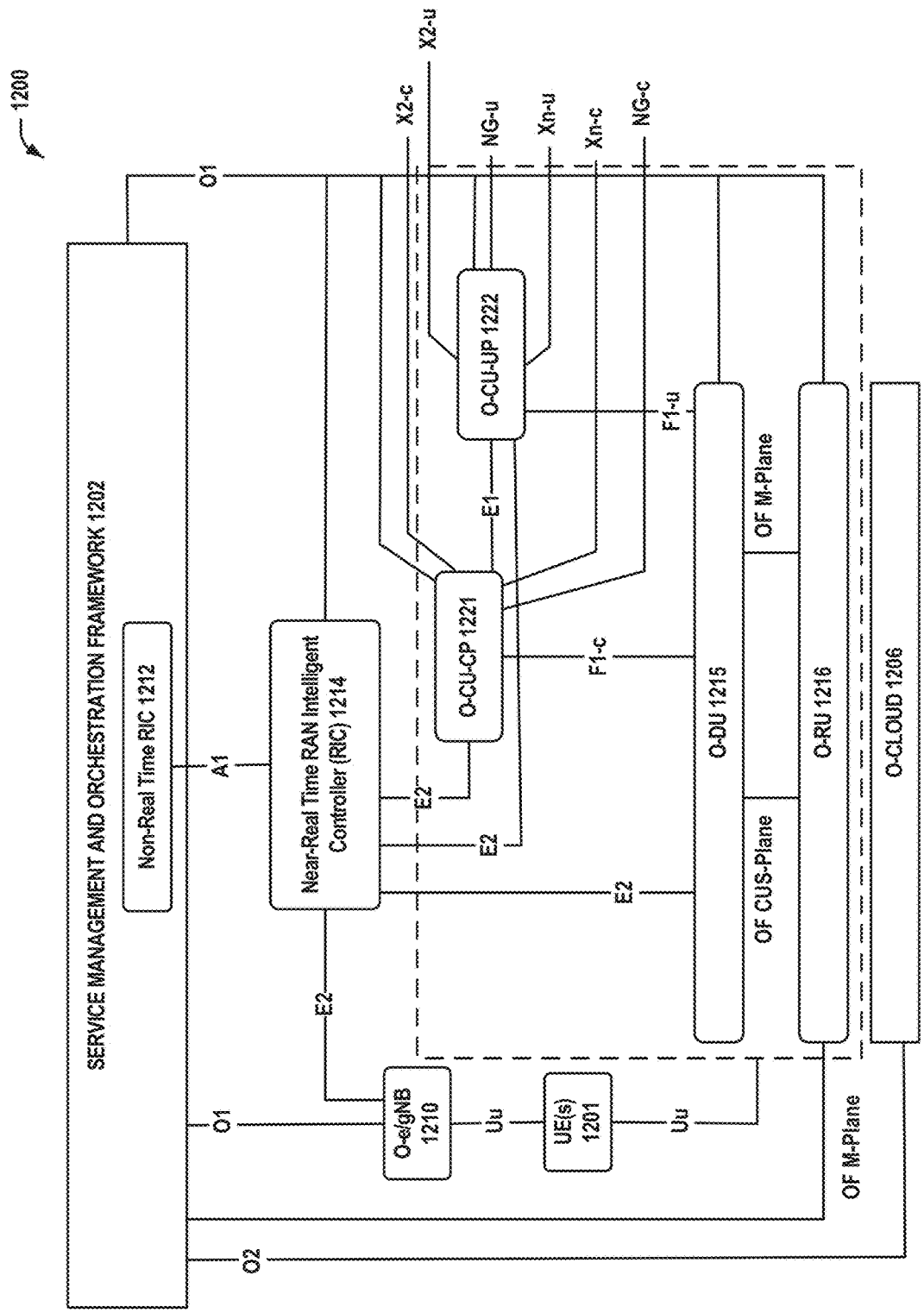
FIG. 12 illustrates an O-RAN logical architecture that corresponds to the O-RAN architecture of FIG. 11, in accordance with various embodiments.

FIG. 12 shows an O-RAN logical architecture 1200 corresponding to the O-RAN architecture 1100 of FIG. 11. In FIG. 12, the SMO 1202 corresponds to the SMO 1102, O-Cloud 1206 corresponds to the O-Cloud 1106, the non-RT RIC 1212 corresponds to the non-RT RIC 1112, the near-RT RIC 1214 corresponds to the near-RT RIC 1114, and the O-RU 1216 corresponds to the O-RU 1116 of FIG. 12, respectively. The O-RAN logical architecture 1200 includes a radio portion and a management portion.

The management portion/side of the architectures 1200 includes the SMO Framework 1202 containing the non-RT RIC 1212, and may include the O-Cloud 1206. The O-Cloud 1206 is a cloud computing platform including a collection of physical infrastructure nodes to host the relevant O-RAN functions (e.g., the near-RT RIC 1214, O-CU-CP 1221, O-CU-UP 1222, and the O-DU 1215), supporting software components (e.g., OSs, VMMs, container runtime engines, ML engines, etc.), and appropriate management and orchestration functions.

The radio portion/side of the logical architecture 1200 includes the near-RT RIC 1214, the O-RAN Distributed Unit (O-DU) 1215, the O-RU 1216, the O-RAN Central Unit-Control Plane (O-CU-CP) 1221, and the O-RAN Central Unit-User Plane (O-CU-UP) 1222 functions. The radio portion/side of the logical architecture 1200 may also include the O-e/gNB 1210.

The O-DU 1215 is a logical node hosting RLC, MAC, and higher PHY layer entities/elements (High-PHY layers) based on a lower layer functional split. The O-RU 1216 is a logical node hosting lower PHY layer entities/elements (Low-PHY layer) (e.g., FFT/iFFT, PRACH extraction, etc.) and RF processing elements based on a lower layer functional split. Virtualization of O-RU 1216 is FFS. The O-CU-CP 1221 is a logical node hosting the RRC and the control plane (CP) part of the PDCP protocol. The O O-CU-UP 1222 is a logical node hosting the user plane part of the PDCP protocol and the SDAP protocol.

An E2 interface terminates at a plurality of E2 nodes. The E2 nodes are logical nodes/entities that terminate the E2 interface. For NR/5G access, the E2 nodes include the O-CU-CP 1221, O-CU-UP 1222, O-DU 1215, or any combination of elements as defined in O-RAN Alliance Working Group 3, Near-Real-time RAN Intelligent Controller Architecture & E2 General Aspects and Principles ("ORAN-WG3.E2GAP.0-v0.1"). For E-UTRA access the E2 nodes include the O-e/gNB 1210. As shown in FIG. 12, the E2 interface also connects the O-e/gNB 1210 to the Near-RT RIC 1214. The protocols over E2 interface are based exclusively on Control Plane (CP) protocols. The E2 functions are grouped into the following categories: (a) near-RT RIC 1214 services (REPORT, INSERT, CONTROL and POLICY, as described in ORAN-WG3.E2GAP.0-v0.1); and (b) near-RT RIC 1214 support functions, which include E2 Interface Management (E2 Setup, E2 Reset, Reporting of General Error Situations, etc.) and Near-RT RIC Service Update (e.g., capability exchange related to the list of E2 Node functions exposed over E2).

FIG. 12 shows the Uu interface between a UE 1201 and O-e/gNB 1210 as well as between the UE 1201 and O-RAN components. The Uu interface is a 3GPP defined interface (see e.g., sections 5.2 and 5.3 of 3GPP TS38.401 v16.0.0 (2020-01-09)), which includes a complete protocol stack from L1 to L3 and terminates in the NG-RAN or E-UTRAN. The O-e/gNB 1210 is an LTE eNB (see 3GPP TS36.401 v15.1.0 (2019-01-09)), a 5G gNB or ng-eNB (see 3GPP TS38.300 v16.0.0 (2020-01-08)) that supports the E2 interface. The O-e/gNB 1210 may be the same or similar as AN 808 and/or AN 904 discussed previously. The UE 1201 may correspond to UE 802 and/or UE 902 discussed with respect to FIGS. 8 and 9, and/or the like. There may be multiple UEs 1201 and/or multiple O-e/gNB 1210, each of which may be connected to one another the via respective Uu interfaces. Although not shown in FIG. 12, the O-e/gNB 1210 supports O-DU 1215 and O-RU 1216 functions with an Open Fronthaul interface between them.

The Open Fronthaul (OF) interface(s) is/are between O-DU 1215 and O-RU 1216 functions (see, ORAN-WG4.MP.0-v02.00.00; O-RAN Alliance Working Group 4, O-RAN Fronthaul Control, User and Synchronization Plane Specification, version 2.0 (July 2019) ("ORAN-WG4.CUS.O-v02.00"). The OF interface(s) includes the Control User Synchronization (CUS) Plane and Management (M) Plane. FIGS. 11 and 12 also show that the O-RU 1216 terminates the OF M-Plane interface towards the O-DU 1215 and optionally towards the SMO 1202 as specified in ORAN-WG4.MP.0-v02.00.00. The O-RU 1216 terminates the OF CUS-Plane interface towards the O-DU 1215 and the SMO 1202.

The F1-c interface connects the O-CU-CP 1221 with the O-DU 1215. As defined by 3GPP, the F1-c interface is between the gNB-CU-CP and gNB-DU nodes (see 3GPP TS 38.401, 3GPP TS38.470 v16.0.0 (2020-01-09)). However, for purposes of O-RAN, the F1-c interface is adopted between the O-CU-CP 1221 with the O-DU 1215 functions while reusing the principles and protocol stack defined by 3GPP and the definition of interoperability profile specifications.

The F1-u interface connects the O-CU-UP 1222 with the O-DU 1215. As defined by 3GPP, the F1-u interface is between the gNB-CU-UP and gNB-DU nodes (see, 3GPP TS 38.401, 3GPP TS38.470). However, for purposes of O-RAN, the F1-u interface is adopted between the O-CU-UP 1222 with the O-DU 1215 functions while reusing the principles and protocol stack defined by 3GPP and the definition of interoperability profile specifications.

The NG-c interface is defined by 3GPP as an interface between the gNB-CU-CP and the AMF in the 5GC (see 3GPP TS38.300). The NG-c is also referred as the N2 interface (see 3GPP TS38.300). The NG-u interface is defined by 3GPP, as an interface between the gNB-CU-UP and the UPF in the 5GC (see 3GPP TS38.300). The NG-u interface is referred as the N3 interface (see 3GPP TS38.300). In O-RAN, NG-c and NG-u protocol stacks defined by 3GPP are reused and may be adapted for O-RAN purposes.

The X2-c interface is defined in 3GPP for transmitting control plane information between eNBs or between eNB and en-gNB in EN-DC. The X2-u interface is defined in 3GPP for transmitting user plane information between eNBs or between eNB and en-gNB in EN-DC (see e.g., 3GPP TS36.420 v15.2.0 (2020-01-09), 3GPP TS38.300). In O-RAN, X2-c and X2-u protocol stacks defined by 3GPP are reused and may be adapted for O-RAN purposes The Xn-c interface is defined in 3GPP for transmitting control plane information between gNBs, ng-eNBs, or between an ng-eNB and gNB. The Xn-u interface is defined in 3GPP for transmitting user plane information between gNBs, ng-eNBs, or between ng-eNB and gNB (see e.g., 3GPP TS38.300, 3GPP TS38.420 v15.2.0 (2019-01-08)). In O-RAN, Xn-c and Xn-u protocol stacks defined by 3GPP are reused and may be adapted for O-RAN purposes The E1 interface is defined by 3GPP as being an interface between the gNB-CU-CP (e.g., gNB-CU-CP 3728) and gNB-CU-UP (see e.g., 3GPP TS38.401, 3GPP TS38.460 v16.0.0 (2020-01-09)). In O-RAN, E1 protocol stacks defined by 3GPP are reused and adapted as being an interface between the O-CU-CP 1221 and the O-CU-UP 1222 functions.

The O-RAN Non-Real Time (RT) RAN Intelligent Controller (RIC) 1212 is a logical function within the SMO framework 1102, 1202 that enables non-real-time control and optimization of RAN elements and resources; AI/machine learning (ML) workflow(s) including model training, inferences, and updates; and policy-based guidance of applications/features in the Near-RT RIC 1214.

The O-RAN near-RT RIC 1214 is a logical function that enables near-real-time control and optimization of RAN elements and resources via fine-grained data collection and actions over the E2 interface. The near-RT RIC 1214 may include one or more AI/ML workflows including model training, inferences, and updates.

The non-RT RIC 1212 can be an ML training host to host the training of one or more ML models. ML training can be performed offline using data collected from the RIC, O-DU 1215 and O-RU 1216. For supervised learning, non-RT RIC 1212 is part of the SMO 1202, and the ML training host and/or ML model host/actor can be part of the non-RT RIC 1212 and/or the near-RT RIC 1214. For unsupervised learning, the ML training host and ML model host/actor can be part of the non-RT RIC 1212 and/or the near-RT RIC 1214. For reinforcement learning, the ML training host and ML model host/actor may be co-located as part of the non-RT RIC 1212 and/or the near-RT RIC 1214. In some implementations, the non-RT RIC 1212 may request or trigger ML model training in the training hosts regardless of where the model is deployed and executed. ML models may be trained and not currently deployed.

In some implementations, the non-RT RIC 1212 provides a query-able catalog for an ML designer/developer to publish/install trained ML models (e.g., executable software components). In these implementations, the non-RT RIC 1212 may provide discovery mechanism if a particular ML model can be executed in a target ML inference host (MF), and what number and type of ML models can be executed in the MF. For example, there may be three types of ML catalogs made disoverable by the non-RT RIC 1212: a design-time catalog (e.g., residing outside the non-RT RIC 1212 and hosted by some other ML platform(s)), a training/deployment-time catalog (e.g., residing inside the non-RT RIC 1212), and a run-time catalog (e.g., residing inside the non-RT RIC 1212). The non-RT RIC 1212 supports necessary capabilities for ML model inference in support of ML assisted solutions running in the non-RT RIC 1212 or some other ML inference host. These capabilities enable executable software to be installed such as VMs, containers, etc. The non-RT RIC 1212 may also include and/or operate one or more ML engines, which are packaged software executable libraries that provide methods, routines, data types, etc., used to run ML models. The non-RT RIC 1212 may also implement policies to switch and activate ML model instances under different operating conditions.

The non-RT RIC 122 is be able to access feedback data (e.g., FM and PM statistics) over the O1 interface on ML model performance and perform necessary evaluations. If the ML model fails during runtime, an alarm can be generated as feedback to the non-RT RIC 1212. How well the ML model is performing in terms of prediction accuracy or other operating statistics it produces can also be sent to the non-RT RIC 1212 over O1. The non-RT RIC 1212 can also scale ML model instances running in a target MF over the O1 interface by observing resource utilization in MF. The environment where the ML model instance is running (e.g., the MF) monitors resource utilization of the running ML model. This can be done, for example, using an ORAN-SC component called ResourceMonitor in the near-RT RIC 1214 and/or in the non-RT RIC 1212, which continuously monitors resource utilization. If resources are low or fall below a certain threshold, the runtime environment in the near-RT RIC 1214 and/or the non-RT RIC 1212 provides a scaling mechanism to add more ML instances. The scaling mechanism may include a scaling factor such as an number, percentage, and/or other like data used to scale up/down the number of ML instances. ML model instances running in the target ML inference hosts may be automatically scaled by observing resource utilization in the MF. For example, the Kubernetes® (K8s) runtime environment typically provides an auto-scaling feature.

The A1 interface is between the non-RT RIC 1212 (within or outside the SMO 1202) and the near-RT RIC 1214. The A1 interface supports three types of services as defined in O-RAN Alliance Working Group 2, O-RAN A1 interface: General Aspects and Principles Specification, version 1.0 (October 2019) ("ORAN-WG2.A1.GA&P-v01.00"), including a Policy Management Service, an Enrichment Information Service, and ML Model Management Service. A1 policies have the following characteristics compared to persistent configuration (see ORAN-WG2.ALGA&P-v01.00): A1 policies are not critical to traffic; A1 policies have temporary validity; A1 policies may handle individual UE or dynamically defined groups of UEs; A1 policies act within and take precedence over the configuration; and A1 policies are non-persistent, e.g., do not survive a restart of the near-RT RIC.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

Example 1 includes one or more non-transitory computer-readable media (NTCRM) having instructions stored thereon, that when executed by one or more processors cause a device to: obtain a channel covariance matrix associated with a channel for multiple input multiple output (MIMO) communication; select a first number of columns of the channel covariance matrix to obtain a sub-matrix, wherein the first number is less than a total number of columns of the channel covariance matrix; compute a QR decomposition of the sub-matrix to obtain a matrix Q; and generate a compressed matrix that includes a second number of columns of the matrix Q, wherein the second number is equal to or less than the first number.

Example 2 includes the one or more NTCRM of Example 1, wherein the first number of columns are selected randomly or deterministically.

Example 3 includes the one or more NTCRM of Example 1, wherein the QR decomposition is a sorted QR decomposition.

Example 4 includes the one or more NTCRM of Example 1, wherein the channel covariance matrix is associated with received sounding reference signals (SRSs) from respective user equipments (UEs).

Example 5 includes the one or more NTCRM of Example 4, wherein the device is a baseband unit (BBU), and wherein the instructions, when executed, are further to cause the BBU to send the compressed matrix to a radio unit (RU) for MIMO spatial compression by the RU of data or control signals received on the channel.

Example 6 includes the one or more NTCRM of Example 1, wherein the channel covariance matrix is combined across individual user equipments (UEs), and wherein the instructions, when executed, are further to cause the device to: determine beamforming vectors based on the compressed matrix; and receive MIMO signals from a plurality of UEs based on the determined beamforming vectors.

Example 7 includes the one or more NTCRM of Example 1, wherein the channel covariance matrix is associated with a UE, and wherein the instructions, when executed, are further to cause the device to: determine beamforming weights based on the compressed matrix; and receive an uplink signal from the UE or transmit a downlink signal to the UE based on the determined beamforming weights.

Example 8 includes the one or more NTCRM of Example 1, wherein the device is an open radio unit (O-RU).

Example 9 includes the one or more NTCRM of Example 1, wherein the device is an open distributed unit (O-DU).

Example 10 includes the one or more NTCRM of Example 1, wherein the MIMO communication is massive MIMO communication.

Example 11 includes one or more non-transitory computer-readable media (NTCRM) having instructions stored thereon, that when executed by one or more processors cause a distributed unit (DU) to: generate a matrix C' that includes a first number of columns of an overall covariance matrix that is combined across individual user equipments (UEs) of a plurality of UEs, wherein the first number is less than a total number of columns of the overall covariance matrix; compute a QR decomposition of the matrix C' to obtain a matrix Q; generate a compressed matrix that includes a second number of columns of the matrix Q, wherein the second number is equal to or less than the first number; determine beamforming vectors based on the compressed matrix; and receive signals from the plurality of UEs based on the determined beamforming vectors.

Example 12 includes the one or more NTCRM of Example 11, wherein the instructions, when executed, are further to cause the DU to compute only the first number of columns of the overall covariance matrix.

Example 13 includes the one or more NTCRM of Example 11, wherein the second number is less than the first number.

Example 14 includes the one or more NTCRM of Example 12, wherein the instructions, when executed, are further to cause the DU to provide the beamforming vectors to a radio unit (RU) for uplink compression.

Example 15 includes the one or more NTCRM of Example 14, wherein to receive signals from the plurality of UEs based on the determined beamforming vectors includes to receive compressed signals from the RU based on the beamforming vectors.

Example 16 includes the one or more NTCRM of Example 11, wherein the DU is an open DU (O-DU) of an open radio access network (O-RAN).

Example 17 includes an apparatus to be implemented in a device of a radio access network, the apparatus comprising processor circuitry to: obtain a covariance matrix associated with a channel for massive multiple input multiple output (mMIMO) communication; select a first number of columns of the channel covariance matrix to obtain a sub-matrix, wherein the first number is less than a total number of columns of the covariance matrix; compute a QR decomposition of the sub-matrix to obtain a matrix Q; generate a compressed matrix that includes a second number of columns of the matrix Q, wherein the second number is equal to or less than the first number; and receive uplink signals from a plurality of user equipments (UEs) or encode downlink signals for transmission to the plurality of UEs based on the compressed matrix. The apparatus further includes a memory to store the compressed matrix.

Example 18 includes the apparatus of Example 17, wherein the first number of columns are selected randomly or deterministically.

Example 19 includes the apparatus of Example 17, wherein the QR decomposition is a sorted QR decomposition.

Example 20 includes the apparatus of Example 17, wherein the processing circuitry is further to: compute the covariance matrix based on received sounding reference signals (SRSs) from respective user equipments (UEs); and send the compressed matrix to a radio unit (RU) for mMIMO spatial compression by the RU of data or control signals received on the channel.

Example 21 includes the apparatus of Example 17, wherein the covariance matrix is combined across individual UEs of the plurality of UEs, and wherein the processing circuitry is further to: determine beamforming vectors based on the compressed matrix; and receive mMIMO signals from the plurality of UEs based on the determined beamforming vectors.

Example 22 includes the apparatus of Example 17, wherein the processing circuitry is to determine beamforming weights based on the compressed matrix, and wherein the uplink signals are received or the downlink signals are encoded based on the determined beamforming weights.

Example 23 includes the apparatus of Example 17, wherein the device is remote radio unit (RRU).

Example 24 includes the apparatus of Example 17, wherein the device is baseband unit (BBU).

Example 25 includes the apparatus of Example 17, wherein the RAN is an open RAN (O-RAN).

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Terminology

For the purposes of the present document, the following terms and definitions are applicable to the examples and embodiments discussed herein.

The term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, and/or transferring digital data. Processing circuitry may include one or more processing cores to execute instructions and one or more memory structures to store program and data information. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes. Processing circuitry may include more hardware accelerators, which may be microprocessors, programmable processing devices, or the like. The one or more hardware accelerators may include, for example, computer vision (CV) and/or deep learning (DL) accelerators. The terms "application circuitry" and/or "baseband circuitry" may be considered synonymous to, and may be referred to as, "processor circuitry."

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, and/or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "network element" as used herein refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, and/or the like.

The term "computer system" as used herein refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "appliance," "computer appliance," or the like, as used herein refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or link, and/or the like.

The invention claimed is:

1. One or more non-transitory computer-readable media (NTCRM) having instructions stored thereon, that when executed by one or more processors cause a device to:
   obtain a channel covariance matrix associated with a channel for multiple input multiple output (MIMO) communication;
   select a first number of columns of the channel covariance matrix to obtain a sub-matrix, wherein the first number is less than a total number of columns of the channel covariance matrix;
   compute a QR decomposition of the sub-matrix to obtain a matrix Q; and
   generate a compressed matrix that includes a second number of columns of the matrix Q, wherein the second number is equal to or less than the first number.

2. The one or more NTCRM of claim 1, wherein the first number of columns are selected randomly or deterministically.

3. The one or more NTCRM of claim 1, wherein the QR decomposition is a sorted QR decomposition.

4. The one or more NTCRM of claim 1, wherein the channel covariance matrix is associated with received sounding reference signals (SRSs) from respective user equipments (UEs).

5. The one or more NTCRM of claim 4, wherein the device is a baseband unit (BBU), and wherein the instructions, when executed, are further to cause the BBU to send the compressed matrix to a radio unit (RU) for MIMO spatial compression by the RU of data or control signals received on the channel.

6. The one or more NTCRM of claim 1, wherein the channel covariance matrix is combined across individual user equipments (UEs), and wherein the instructions, when executed, are further to cause the device to:
   determine beamforming vectors based on the compressed matrix; and
   receive MIMO signals from a plurality of UEs based on the determined beamforming vectors.

7. The one or more NTCRM of claim 1, wherein the channel covariance matrix is associated with a UE, and wherein the instructions, when executed, are further to cause the device to:
   determine beamforming weights based on the compressed matrix; and
   receive an uplink signal from the UE or transmit a downlink signal to the UE based on the determined beamforming weights.

8. The one or more NTCRM of claim 1, wherein the device is an open radio unit (O-RU).

9. The one or more NTCRM of claim 1, wherein the device is an open distributed unit (O-DU).

10. The one or more NTCRM of claim 1, wherein the MIMO communication is massive MIMO communication.

11. One or more non-transitory computer-readable media (NTCRM) having instructions stored thereon, that when executed by one or more processors cause a distributed unit (DU) to:
generate a matrix C' that includes a first number of columns of an overall covariance matrix that is combined across individual user equipments (UEs) of a plurality of UEs, wherein the first number is less than a total number of columns of the overall covariance matrix;
compute a QR decomposition of the matrix C' to obtain a matrix Q;
generate a compressed matrix that includes a second number of columns of the matrix Q, wherein the second number is equal to or less than the first number;
determine beamforming vectors based on the compressed matrix; and
receive signals from the plurality of UEs based on the determined beamforming vectors.

12. The one or more NTCRM of claim 11, wherein the instructions, when executed, are further to cause the DU to compute only the first number of columns of the overall covariance matrix.

13. The one or more NTCRM of claim 11, wherein the second number is less than the first number.

14. The one or more NTCRM of claim 12, wherein the instructions, when executed, are further to cause the DU to provide the beamforming vectors to a radio unit (RU) for uplink compression.

15. The one or more NTCRM of claim 14, wherein to receive signals from the plurality of UEs based on the determined beamforming vectors includes to receive compressed signals from the RU based on the beamforming vectors.

16. The one or more NTCRM of claim 11, wherein the DU is an open DU (O-DU) of an open radio access network (O-RAN).

17. An apparatus to be implemented in a device of a radio access network, the apparatus comprising:
processor circuitry to:
obtain a covariance matrix associated with a channel for massive multiple input multiple output (mMIMO) communication;
select a first number of columns of the channel covariance matrix to obtain a sub-matrix, wherein the first number is less than a total number of columns of the covariance matrix;
compute a QR decomposition of the sub-matrix to obtain a matrix Q;
generate a compressed matrix that includes a second number of columns of the matrix Q wherein the second number is equal to or less than the first number; and
receive uplink signals from a plurality of user equipments (UEs) or encode downlink signals for transmission to the plurality of UEs based on the compressed matrix; and
a memory to store the compressed matrix.

18. The apparatus of claim 17, wherein the first number of columns are selected randomly or deterministically.

19. The apparatus of claim 17, wherein the QR decomposition is a sorted QR decomposition.

20. The apparatus of claim 17, wherein the processing circuitry is further to:
compute the covariance matrix based on received sounding reference signals (SRSs) from respective user equipments (UEs); and
send the compressed matrix to a radio unit (RU) for mMIMO spatial compression by the RU of data or control signals received on the channel.

21. The apparatus of claim 17, wherein the covariance matrix is combined across individual UEs of the plurality of UEs, and wherein the processing circuitry is further to:
determine beamforming vectors based on the compressed matrix; and
receive mMIMO signals from the plurality of UEs based on the determined beamforming vectors.

22. The apparatus of claim 17, wherein the processing circuitry is to determine beamforming weights based on the compressed matrix, and wherein the uplink signals are received or the downlink signals are encoded based on the determined beamforming weights.

23. The apparatus of claim 17, wherein the device is remote radio unit (RRU).

24. The apparatus of claim 17, wherein the device is baseband unit (BBU).

25. The apparatus of claim 17, wherein the RAN is an open RAN (O-RAN).

* * * * *

UNITED STATES PATENT AND TRADEMARK OFFICE
CERTIFICATE OF CORRECTION

PATENT NO. : 12,166,555 B2
APPLICATION NO. : 17/357769
DATED : December 10, 2024
INVENTOR(S) : Jan Schreck et al.

Page 1 of 1

It is certified that error appears in the above-identified patent and that said Letters Patent is hereby corrected as shown below:

In the Claims

Column 24
Claim 2, Line 33, replace "are" after "columns" and before "selected randomly" with "is"

Column 26
Claim 17, Line 8, replace "columns of the matrix Q wherein" so it reads "columns of the matrix Q, wherein"

Column 26
Claim 18, Line 17, replace "are" after "columns" and before "selected randomly" with "is"

Column 26
Claim 23, Line 39, add "a" so it reads "the device is a remote radio unit (RRU)."

Column 26
Claim 24, Line 41, add "a" so it reads "the device is a baseband unit (BBU)."

Signed and Sealed this
Fourth Day of February, 2025

Coke Morgan Stewart
*Acting Director of the United States Patent and Trademark Office*